(12) United States Patent
Waugh

(10) Patent No.: US 12,508,252 B2
(45) Date of Patent: Dec. 30, 2025

(54) COMPOSITIONS AND METHODS FOR PAIN RELIEF AND NUMBING

(71) Applicant: Ziropa, Inc., Sunnyvale, CA (US)

(72) Inventor: Jacob Waugh, Irvine, CA (US)

(73) Assignee: RELIEVE THERAPEUTICS PTE. LTD., Singapore (SG)

( * ) Notice: Subject to any disclaimer, the term of this patent is extended or adjusted under 35 U.S.C. 154(b) by 0 days.

(21) Appl. No.: 17/489,349

(22) Filed: Sep. 29, 2021

(65) Prior Publication Data

US 2022/0160689 A1 May 26, 2022

Related U.S. Application Data

(60) Provisional application No. 63/198,092, filed on Sep. 29, 2020.

(51) Int. Cl.
| | |
|---|---|
| *A61K 31/445* | (2006.01) |
| *A61K 31/167* | (2006.01) |
| *A61K 31/195* | (2006.01) |
| *A61K 31/197* | (2006.01) |
| *A61K 47/36* | (2006.01) |
| *A61P 23/02* | (2006.01) |

(52) U.S. Cl.
CPC .......... *A61K 31/445* (2013.01); *A61K 31/167* (2013.01); *A61K 31/195* (2013.01); *A61K 31/197* (2013.01); *A61K 47/36* (2013.01); *A61P 23/02* (2018.01)

(58) Field of Classification Search
CPC ...... A61K 47/14; A61K 47/18; A61K 47/183; A61K 47/26; A61K 8/368; A61K 8/44; A61K 9/06; A61K 9/14; A61K 9/1688; A61K 9/19; A61Q 17/04; A61Q 7/00; A61Q 19/06; A61Q 15/00; A61Q 19/08; C07K 1/00; Y02A 50/30; A61P 23/02; A61P 17/00; A61P 17/14; A61P 17/16; A61P 17/18; A61P 25/08; A61P 27/02; A61P 29/00; A61P 3/02; A61P 31/04; A61P 31/10; A61P 5/44
See application file for complete search history.

(56) References Cited

U.S. PATENT DOCUMENTS

2014/0039061 A1* 2/2014 Wiebensjo ............. A61Q 19/08
 514/626
2017/0290778 A1* 10/2017 Waugh .................... A61P 27/02

* cited by examiner

*Primary Examiner* — Savitha M Rao
(74) *Attorney, Agent, or Firm* — Pauley Erickson & Swanson

(57) ABSTRACT

Compositions containing an anesthetic and an extracellular matrix component or fragment thereof and methods for treating pain by topically administering such compositions are described herein.

15 Claims, 2 Drawing Sheets
Specification includes a Sequence Listing.

SEQUENCE LISTING

```
<160> NUMBER OF SEQ ID NOS: 54

<210> SEQ ID NO 1
<211> LENGTH: 5
<212> TYPE: PRT
<213> ORGANISM: Artificial Sequence
<220> FEATURE:
```

```
<223> OTHER INFORMATION: GAAPG

<400> SEQUENCE: 1

Gly Ala Ala Pro Gly
1               5

<210> SEQ ID NO 2
<211> LENGTH: 5
<212> TYPE: PRT
<213> ORGANISM: Artificial Sequence
<220> FEATURE:
<223> OTHER INFORMATION: GVVPG

<400> SEQUENCE: 2

Gly Val Val Pro Gly
1               5

<210> SEQ ID NO 3
<211> LENGTH: 5
<212> TYPE: PRT
<213> ORGANISM: Artificial Sequence
<220> FEATURE:
<223> OTHER INFORMATION: GGGPG

<400> SEQUENCE: 3

Gly Gly Gly Pro Gly
1               5

<210> SEQ ID NO 4
<211> LENGTH: 5
<212> TYPE: PRT
<213> ORGANISM: Artificial Sequence
<220> FEATURE:
<223> OTHER INFORMATION: GLLPG

<400> SEQUENCE: 4

Gly Leu Leu Pro Gly
1               5

<210> SEQ ID NO 5
<211> LENGTH: 5
<212> TYPE: PRT
<213> ORGANISM: Artificial Sequence
<220> FEATURE:
<223> OTHER INFORMATION: GIIPG

<400> SEQUENCE: 5

Gly Ile Ile Pro Gly
1               5

<210> SEQ ID NO 6
<211> LENGTH: 5
<212> TYPE: PRT
<213> ORGANISM: Artificial Sequence
<220> FEATURE:
<223> OTHER INFORMATION: GSSPG

<400> SEQUENCE: 6

Gly Ser Ser Pro Gly
1               5

<210> SEQ ID NO 7
<211> LENGTH: 5
<212> TYPE: PRT
<213> ORGANISM: Artificial Sequence
<220> FEATURE:
<223> OTHER INFORMATION: GTTPG
```

```
<400> SEQUENCE: 7

Gly Thr Thr Pro Gly
1               5

<210> SEQ ID NO 8
<211> LENGTH: 5
<212> TYPE: PRT
<213> ORGANISM: Artificial Sequence
<220> FEATURE:
<223> OTHER INFORMATION: GCCPG

<400> SEQUENCE: 8

Gly Cys Cys Pro Gly
1               5

<210> SEQ ID NO 9
<211> LENGTH: 5
<212> TYPE: PRT
<213> ORGANISM: Artificial Sequence
<220> FEATURE:
<223> OTHER INFORMATION: GMMPG

<400> SEQUENCE: 9

Gly Met Met Pro Gly
1               5

<210> SEQ ID NO 10
<211> LENGTH: 5
<212> TYPE: PRT
<213> ORGANISM: Artificial Sequence
<220> FEATURE:
<223> OTHER INFORMATION: GFFPG

<400> SEQUENCE: 10

Gly Phe Phe Pro Gly
1               5

<210> SEQ ID NO 11
<211> LENGTH: 5
<212> TYPE: PRT
<213> ORGANISM: Artificial Sequence
<220> FEATURE:
<223> OTHER INFORMATION: GYYPG

<400> SEQUENCE: 11

Gly Tyr Tyr Pro Gly
1               5

<210> SEQ ID NO 12
<211> LENGTH: 5
<212> TYPE: PRT
<213> ORGANISM: Artificial Sequence
<220> FEATURE:
<223> OTHER INFORMATION: GWWPG

<400> SEQUENCE: 12

Gly Trp Trp Pro Gly
1               5

<210> SEQ ID NO 13
<211> LENGTH: 5
<212> TYPE: PRT
<213> ORGANISM: Artificial Sequence
<220> FEATURE:
<223> OTHER INFORMATION: GDDPG
```

```
<400> SEQUENCE: 13

Gly Asp Asp Pro Gly
1               5

<210> SEQ ID NO 14
<211> LENGTH: 5
<212> TYPE: PRT
<213> ORGANISM: Artificial Sequence
<220> FEATURE:
<223> OTHER INFORMATION: GNNPG

<400> SEQUENCE: 14

Gly Asn Asn Pro Gly
1               5

<210> SEQ ID NO 15
<211> LENGTH: 5
<212> TYPE: PRT
<213> ORGANISM: Artificial Sequence
<220> FEATURE:
<223> OTHER INFORMATION: GEEPG

<400> SEQUENCE: 15

Gly Glu Glu Pro Gly
1               5

<210> SEQ ID NO 16
<211> LENGTH: 5
<212> TYPE: PRT
<213> ORGANISM: Artificial Sequence
<220> FEATURE:
<223> OTHER INFORMATION: GQQPG

<400> SEQUENCE: 16

Gly Gln Gln Pro Gly
1               5

<210> SEQ ID NO 17
<211> LENGTH: 5
<212> TYPE: PRT
<213> ORGANISM: Artificial Sequence
<220> FEATURE:
<223> OTHER INFORMATION: GRRPG

<400> SEQUENCE: 17

Gly Arg Arg Pro Gly
1               5

<210> SEQ ID NO 18
<211> LENGTH: 5
<212> TYPE: PRT
<213> ORGANISM: Artificial Sequence
<220> FEATURE:
<223> OTHER INFORMATION: GHHPG

<400> SEQUENCE: 18

Gly His His Pro Gly
1               5

<210> SEQ ID NO 19
<211> LENGTH: 5
<212> TYPE: PRT
<213> ORGANISM: Artificial Sequence
<220> FEATURE:
<223> OTHER INFORMATION: GKKPG

<400> SEQUENCE: 19
```

```
Gly Lys Lys Pro Gly
1               5

<210> SEQ ID NO 20
<211> LENGTH: 5
<212> TYPE: PRT
<213> ORGANISM: Artificial Sequence
<220> FEATURE:
<223> OTHER INFORMATION: GPPPG

<400> SEQUENCE: 20

Gly Pro Pro Pro Gly
1               5

<210> SEQ ID NO 21
<211> LENGTH: 5
<212> TYPE: PRT
<213> ORGANISM: Artificial Sequence
<220> FEATURE:
<223> OTHER INFORMATION: Glycine-3-hydroxyproline-3-hydroxyproline-
      Proline-Glycine

<400> SEQUENCE: 21

Gly Asn Asn Pro Gly
1               5

<210> SEQ ID NO 22
<211> LENGTH: 5
<212> TYPE: PRT
<213> ORGANISM: Artificial Sequence
<220> FEATURE:
<223> OTHER INFORMATION: Glycine-4-hydroxyproline-4-hydroxyproline-
      Proline-Glycine

<400> SEQUENCE: 22

Gly Asn Asn Pro Gly
1               5

<210> SEQ ID NO 23
<211> LENGTH: 5
<212> TYPE: PRT
<213> ORGANISM: Artificial Sequence
<220> FEATURE:
<223> OTHER INFORMATION: RRPEV

<400> SEQUENCE: 23

Arg Arg Pro Glu Val
1               5

<210> SEQ ID NO 24
<211> LENGTH: 8
<212> TYPE: PRT
<213> ORGANISM: Artificial Sequence
<220> FEATURE:
<223> OTHER INFORMATION: QPSQPGGV

<400> SEQUENCE: 24

Gln Pro Ser Gln Pro Gly Gly Val
1               5

<210> SEQ ID NO 25
<211> LENGTH: 4
<212> TYPE: PRT
<213> ORGANISM: Artificial Sequence
<220> FEATURE:
<223> OTHER INFORMATION: PGGV
```

```
<400> SEQUENCE: 25

Pro Gly Gly Val
1

<210> SEQ ID NO 26
<211> LENGTH: 4
<212> TYPE: PRT
<213> ORGANISM: Artificial Sequence
<220> FEATURE:
<223> OTHER INFORMATION: GPGV

<400> SEQUENCE: 26

Gly Pro Gly Val
1

<210> SEQ ID NO 27
<211> LENGTH: 4
<212> TYPE: PRT
<213> ORGANISM: Artificial Sequence
<220> FEATURE:
<223> OTHER INFORMATION: KPGV

<400> SEQUENCE: 27

Lys Pro Gly Val
1

<210> SEQ ID NO 28
<211> LENGTH: 4
<212> TYPE: PRT
<213> ORGANISM: Artificial Sequence
<220> FEATURE:
<223> OTHER INFORMATION: GPGL

<400> SEQUENCE: 28

Gly Pro Gly Leu
1

<210> SEQ ID NO 29
<211> LENGTH: 4
<212> TYPE: PRT
<213> ORGANISM: Artificial Sequence
<220> FEATURE:
<223> OTHER INFORMATION: EGSA

<400> SEQUENCE: 29

Glu Gly Ser Ala
1

<210> SEQ ID NO 30
<211> LENGTH: 4
<212> TYPE: PRT
<213> ORGANISM: Artificial Sequence
<220> FEATURE:
<223> OTHER INFORMATION: PGGF

<400> SEQUENCE: 30

Pro Gly Gly Phe
1

<210> SEQ ID NO 31
<211> LENGTH: 4
<212> TYPE: PRT
<213> ORGANISM: Artificial Sequence
<220> FEATURE:
<223> OTHER INFORMATION: GGGA

<400> SEQUENCE: 31
```

```
Gly Gly Gly Ala
1

<210> SEQ ID NO 32
<211> LENGTH: 5
<212> TYPE: PRT
<213> ORGANISM: Artificial Sequence
<220> FEATURE:
<223> OTHER INFORMATION: KPGKV

<400> SEQUENCE: 32

Lys Pro Gly Lys Val
1               5

<210> SEQ ID NO 33
<211> LENGTH: 4
<212> TYPE: PRT
<213> ORGANISM: Artificial Sequence
<220> FEATURE:
<223> OTHER INFORMATION: KPKA

<400> SEQUENCE: 33

Lys Pro Lys Ala
1

<210> SEQ ID NO 34
<211> LENGTH: 5
<212> TYPE: PRT
<213> ORGANISM: Artificial Sequence
<220> FEATURE:
<223> OTHER INFORMATION: GPGGV

<400> SEQUENCE: 34

Gly Pro Gly Gly Val
1               5

<210> SEQ ID NO 35
<211> LENGTH: 4
<212> TYPE: PRT
<213> ORGANISM: Artificial Sequence
<220> FEATURE:
<223> OTHER INFORMATION: GPQA

<400> SEQUENCE: 35

Gly Pro Gln Ala
1

<210> SEQ ID NO 36
<211> LENGTH: 5
<212> TYPE: PRT
<213> ORGANISM: Artificial Sequence
<220> FEATURE:
<223> OTHER INFORMATION: GGPGI

<400> SEQUENCE: 36

Gly Gly Pro Gly Ile
1               5

<210> SEQ ID NO 37
<211> LENGTH: 5
<212> TYPE: PRT
<213> ORGANISM: Artificial Sequence
<220> FEATURE:
<223> OTHER INFORMATION: PGPGA

<400> SEQUENCE: 37
```

```
Pro Gly Pro Gly Ala
1               5

<210> SEQ ID NO 38
<211> LENGTH: 4
<212> TYPE: PRT
<213> ORGANISM: Artificial Sequence
<220> FEATURE:
<223> OTHER INFORMATION: GQPF

<400> SEQUENCE: 38

Gly Gln Pro Phe
1

<210> SEQ ID NO 39
<211> LENGTH: 8
<212> TYPE: PRT
<213> ORGANISM: Artificial Sequence
<220> FEATURE:
<223> OTHER INFORMATION: GGKPPKPF

<400> SEQUENCE: 39

Gly Gly Lys Pro Pro Lys Pro Phe
1               5

<210> SEQ ID NO 40
<211> LENGTH: 7
<212> TYPE: PRT
<213> ORGANISM: Artificial Sequence
<220> FEATURE:
<223> OTHER INFORMATION: GGQQPGL

<400> SEQUENCE: 40

Gly Gly Gln Gln Pro Gly Leu
1               5

<210> SEQ ID NO 41
<211> LENGTH: 6
<212> TYPE: PRT
<213> ORGANISM: Artificial Sequence
<220> FEATURE:
<223> OTHER INFORMATION: VGVAPG

<400> SEQUENCE: 41

Val Gly Val Ala Pro Gly
1               5

<210> SEQ ID NO 42
<211> LENGTH: 6
<212> TYPE: PRT
<213> ORGANISM: Artificial Sequence
<220> FEATURE:
<223> OTHER INFORMATION: IGVAPG

<400> SEQUENCE: 42

Ile Gly Val Ala Pro Gly
1               5

<210> SEQ ID NO 43
<211> LENGTH: 7
<212> TYPE: PRT
<213> ORGANISM: Artificial Sequence
<220> FEATURE:
<223> OTHER INFORMATION: PGGVLPG

<400> SEQUENCE: 43

Pro Gly Gly Val Leu Pro Gly
```

```
1               5

<210> SEQ ID NO 44
<211> LENGTH: 6
<212> TYPE: PRT
<213> ORGANISM: Artificial Sequence
<220> FEATURE:
<223> OTHER INFORMATION: VGVVPG

<400> SEQUENCE: 44

Val Gly Val Val Pro Gly
1               5

<210> SEQ ID NO 45
<211> LENGTH: 8
<212> TYPE: PRT
<213> ORGANISM: Artificial Sequence
<220> FEATURE:
<223> OTHER INFORMATION: IGLGPGGV

<400> SEQUENCE: 45

Ile Gly Leu Gly Pro Gly Gly Val
1               5

<210> SEQ ID NO 46
<211> LENGTH: 6
<212> TYPE: PRT
<213> ORGANISM: Artificial Sequence
<220> FEATURE:
<223> OTHER INFORMATION: VGAMPG

<400> SEQUENCE: 46

Val Gly Ala Met Pro Gly
1               5

<210> SEQ ID NO 47
<211> LENGTH: 6
<212> TYPE: PRT
<213> ORGANISM: Artificial Sequence
<220> FEATURE:
<223> OTHER INFORMATION: VGLSPG

<400> SEQUENCE: 47

Val Gly Leu Ser Pro Gly
1               5

<210> SEQ ID NO 48
<211> LENGTH: 6
<212> TYPE: PRT
<213> ORGANISM: Artificial Sequence
<220> FEATURE:
<223> OTHER INFORMATION: IGAMPG

<400> SEQUENCE: 48

Ile Gly Ala Met Pro Gly
1               5

<210> SEQ ID NO 49
<211> LENGTH: 6
<212> TYPE: PRT
<213> ORGANISM: Artificial Sequence
<220> FEATURE:
<223> OTHER INFORMATION: IGLSPG

<400> SEQUENCE: 49

Ile Gly Leu Ser Pro Gly
1               5
```

```
<210> SEQ ID NO 50
<211> LENGTH: 6
<212> TYPE: PRT
<213> ORGANISM: Artificial Sequence
<220> FEATURE:
<223> OTHER INFORMATION: GVAPGV

<400> SEQUENCE: 50

Gly Val Ala Pro Gly Val
1               5

<210> SEQ ID NO 51
<211> LENGTH: 6
<212> TYPE: PRT
<213> ORGANISM: Artificial Sequence
<220> FEATURE:
<223> OTHER INFORMATION: VAPGVG

<400> SEQUENCE: 51

Val Ala Pro Gly Val Gly
1               5

<210> SEQ ID NO 52
<211> LENGTH: 6
<212> TYPE: PRT
<213> ORGANISM: Artificial Sequence
<220> FEATURE:
<223> OTHER INFORMATION: APGVGV

<400> SEQUENCE: 52

Ala Pro Gly Val Gly Val
1               5

<210> SEQ ID NO 53
<211> LENGTH: 6
<212> TYPE: PRT
<213> ORGANISM: Artificial Sequence
<220> FEATURE:
<223> OTHER INFORMATION: PGVGVA

<400> SEQUENCE: 53

Pro Gly Val Gly Val Ala
1               5

<210> SEQ ID NO 54
<211> LENGTH: 6
<212> TYPE: PRT
<213> ORGANISM: Artificial Sequence
<220> FEATURE:
<223> OTHER INFORMATION: GVGVAP

<400> SEQUENCE: 54

Gly Val Gly Val Ala Pro
1               5
```

COMPOSITIONS AND METHODS FOR PAIN RELIEF AND NUMBING

CROSS-REFERENCE TO RELATED APPLICATIONS

This application claims the benefit of U.S. Provisional No. 63/198,092, entitled "Compositions and Methods for Pain Relief and Numbing," filed Sep. 29, 2020, the entirety of which is hereby incorporated by reference.

REFERENCE TO SEQUENCE LISTING

A Sequence Listing submitted as an ASCII text file via EFS-WEB is hereby incorporated by reference in accordance with 35 U.S.C. § 1.52(e). The name of the ASCII text file for the Sequence Listing is ST25.txt, the date of the creation of the ASCII text file is Feb. 9, 2022 and the size of the ASCII text file is 8.25 KB.

GOVERNMENT INTERESTS

Not applicable

PARTIES TO A JOINT RESEARCH AGREEMENT

Not applicable

INCORPORATION OF MATERIAL ON COMPACT DISC

Not applicable

BACKGROUND

Pain management is a great challenge for healthcare professionals as pain often can debilitate individuals in ways that affect their day-to-day functioning and productivity. Physicians are often reluctant to administer large doses of analgesic drugs for fear of respiratory depression or other complications. The same holds true for currently available opioid-based drug therapies which can produce undesirable side effects such as hallucinations, constipation, sedation, nausea, and dysphoria.

SUMMARY OF THE INVENTION

Various embodiments of the invention are directed to compositions containing an anesthetic and an extracellular matrix component or fragment thereof. In some embodiments, the anesthetic may be lidocaine, lidocaine HCl, bupivacaine, bupivacaine HCl, gabapentin, gabapentin HCl, pregabalin, pregabalin HCl, and combinations thereof, and in some embodiments, the composition may include about 0.1 wt. % to about 10 wt. % anesthetic based on the total weight of the compositions. In certain embodiments, the composition may contain about 5 wt. % to about 25 wt. % extracellular matrix component or fragment thereof active agent based on the total weight of the compositions, and the extracellular matrix component or fragment thereof may be, for example, hyaluronic acid, collagen, fibronectin, elastin, lectin, fragments thereof, or combinations thereof. In particular embodiments, the extracellular matrix component or fragment thereof may be hyaluronic acid or fragments of hyaluronic acid. In some embodiments, the extracellular matrix component or fragment thereof may have an average molecular weight of about 2,000 Da to about 100,000 Da, and in some embodiments, at least 99.9% of the extracellular matrix component or fragment thereof may have a molecular weight of less than 59,000 Da.

In various embodiments, the composition may include additives such as, for example, diluents, fillers, disintegrants, binders, lubricants, surfactants, hydrophobic vehicles, antioxidants, vitamins, water soluble vehicles, emulsifiers, buffers, humectants, moisturizers, solubilizers, preservatives, colorants, plasticizers, carriers, excipients, secondary active agents and combinations thereof. The composition may be formulated as a liquid, gel, cream, powder, or spray, and in some embodiments, the composition may further include lipid nanoparticles, microparticles, colloidal lipids, and combinations thereof.

Other embodiments are directed to methods for treating a subject in need treatment by topically administering to a surface tissue of the subject a composition comprising an anesthetic and an extracellular matrix component or fragment thereof. In some embodiments, the anesthetic may be lidocaine, lidocaine HCl, bupivacaine, bupivacaine HCl, gabapentin, gabapentin HCl, pregabalin, pregabalin HCl, and combinations thereof, and in some embodiments, the composition may include about 0.1 wt. % to about 10 wt. % anesthetic based on the total weight of the compositions. In certain embodiments, the composition may contain about 5 wt. % to about 25 wt. % extracellular matrix component or fragment thereof active agent based on the total weight of the compositions, and the extracellular matrix component or fragment thereof may be, for example, hyaluronic acid, collagen, fibronectin, elastin, lectin, fragments thereof, or combinations thereof. In particular embodiments, the extracellular matrix component or fragment thereof may be hyaluronic acid or fragments of hyaluronic acid. In some embodiments, the extracellular matrix component or fragment thereof may have an average molecular weight of about 2,000 Da to about 100,000 Da, and in some embodiments, at least 99.9% of the extracellular matrix component or fragment thereof may have a molecular weight of less than 59,000 Da. In various embodiments, the anesthesia effect may be attained within the first 300 seconds after administering.

Further embodiments are directed to methods for treating a subject in need treatment by administering of the subject by injection a composition comprising an anesthetic and an extracellular matrix component or fragment thereof. In some embodiments, the anesthetic may be lidocaine, lidocaine HCl, bupivacaine, bupivacaine HCl, gabapentin, gabapentin HCl, pregabalin, pregabalin HCl, and combinations thereof, and in some embodiments, the composition may include about 0.1 wt. % to about 10 wt. % anesthetic based on the total weight of the compositions. In certain embodiments, the composition may contain about 5 wt. % to about 25 wt. % extracellular matrix component or fragment thereof active agent based on the total weight of the compositions, and the extracellular matrix component or fragment thereof may be, for example, hyaluronic acid, collagen, fibronectin, elastin, lectin, fragments thereof, or combinations thereof. In particular embodiments, the extracellular matrix component or fragment thereof may be hyaluronic acid or fragments of hyaluronic acid. In some embodiments, the extracellular matrix component or fragment thereof may have an average molecular weight of about 2,000 Da to about 100,000 Da, and in some embodiments, at least 99.9% of the extracellular matrix component or fragment thereof may have a molecular weight of less than 59,000 Da. In various embodiments, the anesthesia effect may be attained within the first 300 seconds after injecting.

In various embodiments of methods described above, the composition may include additives such as, for example, diluents, fillers, disintegrants, binders, lubricants, surfactants, hydrophobic vehicles, antioxidants, vitamins, water soluble vehicles, emulsifiers, buffers, humectants, moisturizers, solubilizers, preservatives, colorants, plasticizers, carriers, excipients, secondary active agents and combinations thereof. The composition may be formulated as a liquid, gel, cream, powder, or spray, and in some embodiments, the composition may further include lipid nanoparticles, microparticles, colloidal lipids, and combinations thereof.

Additional embodiments are directed to fillers containing an anesthetic, an extracellular matrix component or fragment thereof, and a dermal filler. In some embodiments, the anesthetic may be lidocaine, lidocaine HCl, bupivacaine, bupivacaine HCl, gabapentin, gabapentin HCl, pregabalin, pregabalin HCl, and combinations thereof, and in some embodiments, the composition may include about 0.1 wt. % to about 10 wt. % anesthetic based on the total weight of the compositions. In certain embodiments, the composition may contain about 5 wt. % to about 25 wt. % extracellular matrix component or fragment thereof active agent based on the total weight of the compositions, and the extracellular matrix component or fragment thereof may be, for example, hyaluronic acid, collagen, fibronectin, elastin, lectin, fragments thereof, or combinations thereof. In particular embodiments, the extracellular matrix component or fragment thereof may be hyaluronic acid or fragments of hyaluronic acid. In some embodiments, the extracellular matrix component or fragment thereof may have an average molecular weight of about 2,000 Da to about 100,000 Da, and in some embodiments, at least 99.9% of the extracellular matrix component or fragment thereof may have a molecular weight of less than 59,000 Da. The dermal filler of such embodiments may be collagen, hyaluronic acid, crosslinked collagen, crosslinked hyaluronic acid, and combinations thereof.

In various embodiments of methods described above, the composition may include additives such as, for example, diluents, fillers, disintegrants, binders, lubricants, surfactants, hydrophobic vehicles, antioxidants, vitamins, water soluble vehicles, emulsifiers, buffers, humectants, moisturizers, solubilizers, preservatives, colorants, plasticizers, carriers, excipients, secondary active agents and combinations thereof. The composition may be formulated as a liquid or a gel.

Yet further embodiments are directed to methods for treating a subject in need of treatment by injecting the subject with fillers described above.

DESCRIPTION OF THE DRAWINGS

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in detail so as to not unnecessarily obscure the present invention.

DETAILED DESCRIPTION

Figure 1:
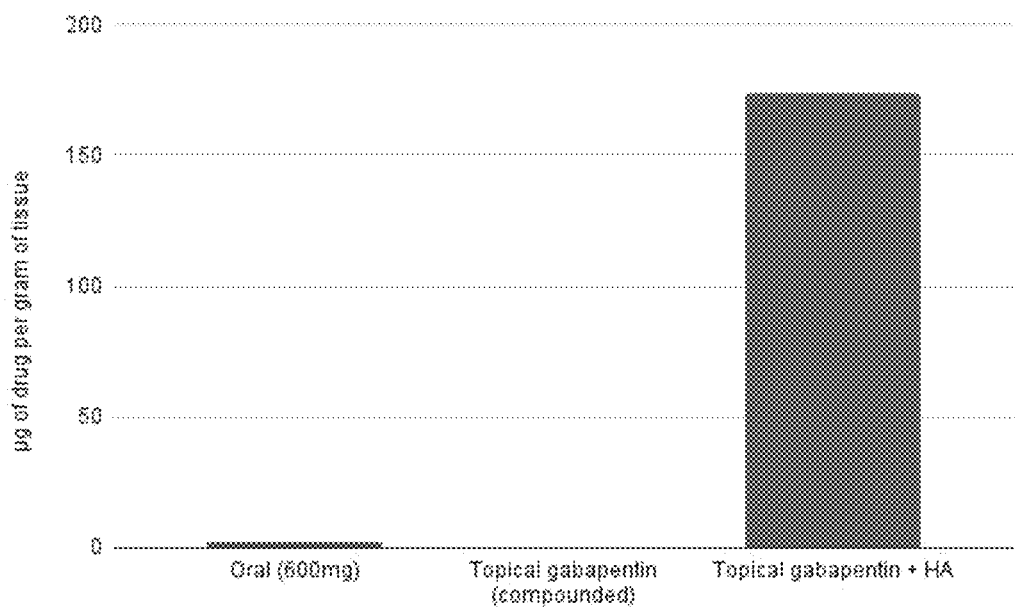
FIG. 1 is a bar graph showing the tissue concentration after topical administration of a composition containing gabapentin and hyaluronic acid.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 µm to 8 µm is stated, 2 µm, 3 µm, 4 µm, 5 µm, 6 µm, and 7 µm are also intended to be explicitly disclosed, as well as the range of values greater than or equal to 1 µm and the range of values less than or equal to 8 µm.

All percentages, parts and ratios are based upon the total weight of the topical compositions and all measurements made are at about 25° C., unless otherwise specified.

The singular forms "a," "an," and "the" include plural referents unless the context clearly dictates otherwise. Thus, for example, reference to a "polymer" includes a single polymer as well as two or more of the same or different polymers; reference to an "excipient" includes a single excipient as well as two or more of the same or different excipients, and the like.

The word "about" when immediately preceding a numerical value means a range of plus or minus 10% of that value, e.g., "about 50" means 45 to 55, "about 25,000" means 22,500 to 27,500, etc, unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g, more than 49.5 to less than 52.5. Furthermore, the phrases "less than about" a value or "greater than about" a value should be understood in view of the definition of the term "about" provided herein.

The terms "administer," "administering" or "administration" as used herein refer to either directly administering a compound (also referred to as an agent of interest) or pharmaceutically acceptable salt of the compound (agent of interest) or a composition to a subject.

The term "carrier" as used herein encompasses carriers, excipients, and diluents, meaning a material, composition or vehicle, such as a liquid or solid filler, diluent, excipient, solvent or encapsulating material involved in carrying or transporting a pharmaceutical, cosmetic or other agent across a tissue layer such as the stratum corneum or stratum spinosum.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. In embodiments or claims where the term comprising is used as the transition phrase, such embodiments can also be envisioned with replacement of the term "comprising" with the terms "consisting of" or "consisting essentially of."

The term "disorder" is used in this disclosure to mean, and is used interchangeably with, the terms disease, condition, or illness, unless otherwise indicated.

The terms "effective amount" and "therapeutically effective amount" are used interchangeably in this disclosure and refer to an amount of a compound that, when administered to a subject, is capable of reducing a symptom of a disorder in a subject or enhance the texture, appearance, color, sensation, or hydration of the intended tissue treatment area. The actual amount which comprises the "effective amount" or "therapeutically effective amount" will vary depending on a number of conditions including, but not limited to, the severity of the disorder, the size and health of the patient, and the route of administration. A skilled medical practitioner can readily determine the appropriate amount using methods known in the medical arts.

The phrase "pharmaceutically acceptable" or "cosmetically acceptable" is employed herein to refer to those agents of interest/compounds, salts, compositions, dosage forms, etc, which are—within the scope of sound medical judgment—suitable for use in contact with the tissues of human beings and/or other mammals without excessive toxicity, irritation, allergic response, or other problem or complication, commensurate with a reasonable benefit/risk ratio. In some aspects, pharmaceutically acceptable means approved by a regulatory agency of the federal or a state government, or listed in the U.S. Pharmacopeia or other generally recognized pharmacopeia for use in mammals (e.g, animals), and more particularly, in humans.

The term "salts" as used herein embraces pharmaceutically acceptable salts commonly used to form alkali metal salts of free acids and to form addition salts of free bases. The nature of the salt is not critical, provided that it is pharmaceutically acceptable. The term "salts" also includes solvates of addition salts, such as hydrates, as well as polymorphs of addition salts. Suitable pharmaceutically acceptable acid addition salts can be prepared from an inorganic acid or from an organic acid. Non-limiting examples of such inorganic acids are hydrochloric, hydrobromic, hydroiodic, nitric, carbonic, sulfuric, and phosphoric acid. Appropriate organic acids can be selected from aliphatic, cycloaliphatic, aromatic, arylaliphatic, and heterocyclyl containing carboxylic acids and sulfonic acids, for example formic, acetic, propionic, succinic, glycolic, gluconic, lactic, malic, tartaric, citric, ascorbic, glucuronic, maleic, fumaric, pyruvic, aspartic, glutamic, benzoic, anthranilic, mesylic, stearic, salicylic, p-hydroxybenzoic, phenylacetic, mandelic, embonic (pamoic), methanesulfonic, ethanesulfonic, benzenesulfonic, pantothenic, toluenesulfonic, 2-hydroxyethanesulfonic, sulfanilic, cyclohexylaminosulfonic, algenic, 3-hydroxybutyric, galactaric and galacturonic acid.

The term "patient" and "subject" are interchangeable and may be taken to mean any living organism which may be treated with compounds of the present invention. As such, the terms "patient" and "subject" may include, but is not limited to, any non-human mammal, primate or human. In some embodiments, the "patient" or "subject" is a mammal, such as mice, rats, other rodents, rabbits, dogs, cats, swine, cattle, sheep, horses, primates, or humans. In some embodiments, the patient or subject is an adult, child or infant. In some embodiments, the patient or subject is a human.

The term "treating" is used herein, for instance, in reference to methods of treating a skin disorder or a systemic condition, and generally includes the administration of a compound or composition which reduces the frequency of, or delays the onset of, symptoms of a medical condition or enhance the texture, appearance, color, sensation, or hydration of the intended tissue treatment area of the tissue surface in a subject relative to a subject not receiving the compound or composition. This can include reversing, reducing, or arresting the symptoms, clinical signs, and underlying pathology of a condition in a manner to improve or stabilize a subject's condition.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, analogs, compounds, ligands, structures, or groups thereof, or any members of a claimed group, less than the full measure of this disclosure can be claimed for any reason. Throughout this disclosure, various patents, patent applications and publications are referenced. The disclosures of these patents, patent applications and publications in their entireties are incorporated into this disclosure by reference in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Various embodiments are directed to pharmaceutical compositions for pain management that include an anesthetic agent and an extracellular matrix component or fragment thereof. Such compositions can be formulated for topical administration or as injectable compositions. In some embodiments, the composition may include a secondary active agent. Other embodiments are directed to methods for treating pain or for therapeutic numbing by topically administering such compositions.

In various embodiments, the anesthetics may be local anesthetic such as, for example, ambucaine, amolanone, amylocaine, benoxinate, benzocaine, betoxycaine, biphetamine, bupivacaine, butacaine, butamben, butanilicaine, butethamine, butoxycaine, carticaine, chloroprocaine, cocaethylene, cocaine, cyclomethycaine, dibucaine, dimethisoquin, dimethocaine, diperodon, dicyclomine, ecgonidine, ecgonine, ethyl chloride, etidocaine, beta-eucaine, euprocin, fenalcomine, fomocaine, hexylcaine, hydroxytetracaine, isobutyl p-aminobenzoate, leucinocaine mesylate, levoxadrol, lidocaine, mepivacaine, meprylcaine, metabutoxycaine, methyl chloride, myrtecaine, naepaine, octocaine, orthocaine, oxethazaine, parethoxycaine, phenacaine, phenol, piperocaine, piridocaine, polidocanol, pramoxine, prilocaine, procaine, propanocaine, proparacaine, propipocaine, propoxycaine, pseudococaine, pyrrocaine, ropivacaine, salicyl alcohol, tetracaine, tolycaine, trimecaine, zolamine, and the like and salts and combinations thereof. In certain embodiments, the anesthetic agent may be lidocaine, and in some embodiments, the lidocaine may be lidocaine HCl.

The concentration of lidocaine in the compositions described herein can be therapeutically effective meaning the concentration is adequate to provide a therapeutic benefit without inflicting harm to the patient. For example, the concentration of anesthetic agent may be about 0.1 wt. % and about 10 wt. % or about 0.2 wt. % to about 7.5 wt. %, about 0.2 wt. % to about 5 wt. % based on the total weight of the composition or any range or individual concentration encompassed by these ranges. In particular embodiments, the concentration of anesthetic agent may be about 2 wt. % to about 5 wt. % based on the total weight of the composition.

The extracellular matrix component or fragment thereof of various embodiments may include any extracellular matrix component, including hyaluronic acid, collagen, fibronectin, elastin, lectin, and combinations thereof or hyaluronic acid fragments, collagen fragments, fibronectin fragments, elastin fragments, lectin fragments, and combinations thereof.

In some embodiments, the extracellular matrix component or fragment thereof may be hyaluronic acid or fragments of hyaluronic acid. Hyaluronic acid is a polymer of disaccharides that is known to interact with, for example, CD44, receptor for hyaluronic acid-mediated motility (RHAMM), and intercellular adhesion molecule-1 (ICAM-1). CD44 is widely distributed throughout the body and mediates cell interaction with hyaluronic acid. ICAM-1 is a metabolic cell surface receptor for hyaluronic acid, and binding of hyaluronic acid to ICAM-1 may contribute to the control of ICAM-1-mediated inflammatory activation.

In some embodiments, the extracellular matrix component or fragment thereof may be collagen or fragments of collagen. The collagen used in such embodiments can be isolated in any form and source and includes collagen type I, collagen type II, collagen type III, collagen type IV, and collagen type V or combinations of these collagens or fragments thereof. Collagen can be in any form including fibrillary, non-fibrillary, disorganized collagen, and combinations and fragments thereof. In some embodiments, collagen can be made by, for example, hydrolysis of full length or large fragments of collagen.

In some embodiments, the extracellular matrix component or fragment thereof may be fibronectin or fragments of fibronectin. Fibronectin is a protein dimer, consisting of two nearly identical monomers linked by a pair of disulfide bonds. Fibronectin binds to membrane-spanning receptor proteins called integrins and collagen, fibrin, heparin sulfate, proteoglycans and other extracellular matrix components. Fibronectin is a large glycoprotein. Fibronectin may therefore include fragments of fibronectin.

In some embodiments, the extracellular matrix component or fragment thereof may be elastin or a fragment of elastin. Elastin is a protein found in connective tissue and allows many tissues in the body to resume their shape after stretching or contracting. Elastin fragments may be obtained commercially or may be generated by protease digestion, such as using proteinase K or thermolysin. In embodiments, the elastin or elastin fragments may be Elastin E91 (from Protein Preparations, Inc., St. Louis, MO), ProK, ProK-60 and/or ProK-60P, which are elastin peptide mixtures derived from the proteolytic digestion of insoluble elastin derived from bovine neck ligaments. In embodiments, the elastin or elastin fragments may comprise an amino acid sequence selected from the group consisting of: GAAPG (SEQ ID NO:1), GVVPG (SEQ ID NO: 2), GGGPG (SEQ ID NO:3), GLLPG (SEQ ID NO:4), GIIPG (SEQ ID NO:5), GSSPG (SEQ ID NO:6), GTTPG (SEQ ID NO:7), GCCPG (SEQ ID NO:8), GMMPG (SEQ ID NO:9), GFFPG (SEQ ID NO: 10), GYYPG (SEQ ID NO:11), GWWPG (SEQ ID NO:12), GDDPG (SEQ ID NO:13), GNNPG (SEQ ID NO:14), GEEPG (SEQ ID NO: 15), GQQPG (SEQ ID NO: 16), GRRPG (SEQ ID NO:17), GHHPG (SEQ ID NO: 18), GKKPG (SEQ ID NO: 19), GPPPG (SEQ ID NO:20), G3Hyp3HypPG (Glycine-3-hydroxyproline-3-hydroxyproline-Proline-Glycine) (SEQ ID NO:21), G4Hyp4HypPG (Glycine-4-hydroxyproline-4-hydroxyproline-Proline-Glycine) (SEQ ID NO:22), RRPEV (SEQ ID NO:23), QPSQPGGV SEQ ID NO:24), PGGV (SEQ ID NO:25), GPGV (SEQ ID NO:26), KPGV (SEQ ID NO:27), GPGL (SEQ ID NO:28), EGSA (SEQ ID NO:29), PGGF (SEQ ID NO:30), GGGA (SEQ ID NO: 31), KPGKV (SEQ ID NO:32), KPKA (SEQ ID NO:33), GPGGV (SEQ ID NO:34), GPQA (SEQ ID NO:35), GGPGI (SEQ ID NO:36), PGPGA (SEQ ID NO:37), GQPF (SEQ ID NO:38), GGKPPKPF (SEQ ID NO:39), GGQQPGL (SEQ ID NO:40), VGVAPG (SEQ ID NO:41), IGVAPG (SEQ ID NO:42), PGGVLPG (SEQ ID NO:43 VGVVPG (SEQ ID NO:44), IGLGPGGV (SEQ ID NO:45), VGAMPG (SEQ ID NO:46) VGLSPG (SEQ ID NO:47), IGAMPG (SEQ ID NO:48), IGLSPG (SEQ ID NO:49), GVAPGV (SEQ ID NO:50), VAPGVG (SEQ ID NO:51), APGVGV (SEQ ID NO:52), PGVGVA (SEQ ID NO: 53), GVGVAP (SEQ ID NO:54), and combinations thereof.

In embodiments, the extracellular matrix component or fragment thereof, and combinations thereof may have specified average molecular weight. For example, in some embodiments, the extracellular matrix component or fragment thereof may have an average molecular weight of about 2,000 Da to about 100,000 Da, about 2,000 Da to about 60,000 Da, about 2,000 Da to about 50,000 Da, about 2,000 Da to about 40,000 Da, about 2,000 Da to about 30,000 Da, about 2,000 to about 20,000 Da, about 2,000 to about 15,000 Da, about 2,000 Da to about 10,000 Da, about 5,000 Da to about 40,000 Da, less than about 60,000 Da, less than about 50,000 Da, less than about 40,000 Da, less than about 30,000 Da, less than about 20,000 Da, less than about 15,000 Da, less than about 10,000 Da, less than about 5,000 Da, about 60,000 Da, about 50,000 Da, about 40,000 Da, about 30,000 Da, about 20,000 Da, about 15,000 Da, about 12,500 Da, about 10,000 Da, about 8,500 Da, about 7,500 Da, about 5,000 Da, about 2,000 Da to about 5,000 Da, about 5,000 Da to about 10,000 Da, about 10,000 Da to about 20,000 Da, about 20,000 Da to about 30,000 Da, about 30,000 Da to about 40,000 Da, about 20,000 Da to about 40,000 Da, about 40,000 Da to about 60,000 Da, or about 60,000 Da to about 100,000 Da or any range or individual average molecular weight falling within these example ranges. In certain embodiments, the extracellular matrix component or fragment thereof have a molecular weight above 150,000 Da, less than 125,000 Da, less than 100,000 Da, less than 90,000 Da, less than 80,000 Da, less than 70,000 Da, less than 60,000 Da, less than 55,000 Da, less than 50,000 Da, less than 45,000 Da, less than 40,000 Da, or less than 35,000 Da.

The concentration of extracellular matrix component or fragment thereof may vary among embodiments and may vary depending on the type and size of extracellular matrix component or fragment thereof. For example, in some embodiments, the extracellular matrix component or fragment thereof may make up about 0.1 wt. % to about 15 wt.

%, about 2 wt. % to about 12 wt. %, about 4 wt. % to about 10 wt. %, about 4 wt. % to about 7 wt. %, about 4 wt. % to about 6 wt. %, about 4.5 wt. % to about 5.5 wt. %, about 4 wt. % to about 5 wt. %, or any range or individual concentration within these example ranges of the composition based on the composition's total weight.

In some embodiments, the compositions of the invention may include a penetration enhancer such as, or example, alcohols, glycols, fatty acids, fatty esters, fatty ethers, occlusive agents, surface active agents, dimethyl amino propionic acid derivatives, terpenes, sulfoxides, cyclic ethers, amides, amines, and the like and combinations thereof.

In some embodiments, the composition penetration enhancer may be a chemical permeation enhancers (CPEs) for transdermal drug delivery. CPEs are known in the art. Suitable CPEs may include, but are not limited to, ethylenediamine tetra-acetic acid (EDTA), bile salt permeation enhancers, such as sodium deoxycholate, sodium taurocholate, sodium deoxycholate, sodium taurodiliydrofusidate, sodium dodecylsulfate, sodium glycocholate, taurocholate, glycocholate, taurocheno-deoxycholate, taurodeoxycholate, deoxycholate, glycodeoxycholate, and ursodeoxycholate, fatty acid permeation enhancers, such as sodium caprate, sodium laurate, sodium caprylate, capric acid, lauric acid, and caprylic acid, acyl carnitines, such as palmitoyl carnitine, stearoyl carnitine, myristoyl carnitine, and lauroyl carnitine, and salicylates, such as sodium salicylate, 5-methoxy salicylate, and methyl salicylate. The amount of permeation enhancer included in the compositions may vary from about 0.1 wt % to about 40 wt %, depending on, for example, the active agent to be delivered, the nature of the permeation enhancer itself, and the dose of formulation to be administered. For example, the permeation enhancers can be included in the formulations in a total amount of about 0.1 wt. % to about 15 wt. %, about 2 wt. % to about 12 wt. %, about 4 wt. % to about 10 wt. %, about 4 wt. % to about 7 wt. %, about 4 wt. % to about 6 wt. %, about 4.5 wt. % to about 5.5 wt. %, about 4 wt. % to about 5 wt. %, or any range or individual concentration within these example ranges.

In some embodiments, the penetration enhancer may be a peptide or protein fragment. Such peptides and protein fragments are generally termed "skin penetrating peptides" (SPPs) or cell penetrating peptides (CPPs). SPPs may stabilize these structural proteins in the skin rather than denaturing them. For example, SPPs bind to keratin proteins through hydrogen bonds and weak electrostatic interactions and may operate as binding mediators between keratin and drug molecules. SPPs may also utilize pathways between corneocytes via diffusion of drug via gaps between cells as well as through lipid bilayers, without disruption. An example of a SPP is TD-1, which is known to loosen the desmosome-induced tight junctions between corneocytes with a change in the space between cells from about 30 nm to about 466 nm in 30 minutes from topical application. The cell gaps increase and then gradually are restored in 1 hour after treatment with TD-1. Various SPPs are known in the art and numerous peptides containing 9 to 19 amino acids have been shown to exhibit skin penetrating activity. Embodiments encompass all such peptides.

The extracellular matrix component or fragment thereof may facilitate delivery of the active agent more efficiently than penetration enhancers that merely act on the stratum corneum of the skin. That is, the amount of active agent delivered at the site of administration is much more when compared to the delivery of the active agent without extracellular matrix component or fragment thereof or active agents in compositions using other penetration enhancers. In some embodiments, the compositions may provide therapeutic equivalence of known topically administered the active agent with that an administered dose that is equal to or at least about 75% less than a standard dose, equal to or about 50% less than a standard dose, equal to or about 25% less than a standard dose, equal to or about 10% less than a standard dose, about 1.0% to about 75% less than a standard dose, about 1.0% to about 50% less than a standard dose, about 1.0% to about 25% less than a standard dose, about 1.0% to about 10% less than a standard dose, about 2.0% to about 75% less than a standard dose, about 2.0% to about 50% less than a standard dose, about 2.0% to about 25% less than a standard dose, about 2.0% to about 10% less than a standard dose, or any range or individual value encompassed by these example ranges.

In some embodiments, the compositions may include hyaluronidase, elastase enzymes, or combinations thereof. The hyaluronidase enzyme family consists of enzymes capable of hydrolyzing or "breaking down" the polysaccharide hyaluronic acid. Hyaluronic acid is an important constituent of connective tissue. Thus, hyaluronidases, which can spread and diffuse rapidly through tissues, can modify the permeability and viscosity of the intercellular cement by hydrolyzing hyaluronic acid. Hyaluronidases can be broadly classified into three groups: mammalian-type hyaluronidases (EC 3.2.1.35) are endo-beta-N-acetylhexosaminidases that produce tetrasaccharides and hexasaccharides as the major end products. They have both hydrolytic and transglycosidase activities, and can degrade hyaluronan and chondroitin sulfates (CS), specifically C4-S and C6-S. Bacterial hyaluronidases (EC 4.2.99.1) degrade hyaluronan and, and to various extents, CS and DS. They are endo-beta-N-acetylhexosaminidases that operate by a beta elimination reaction that yields primarily disaccharide end products. Hyaluronidases (EC 3.2.1.36) from leeches, other parasites, and crustaceans are endo-beta-glucuronidases that generate tetrasaccharide and hexasaccharide end products through hydrolysis of the beta 1-3 linkage.

The hyaluronidase disclosed herein can be derived from any source. For example, hyaluronidase may be recovered from bovine protein (bovine type), leeches or bacteria (e.g. in the form of hyaluronate lyase, vegetables, or genetically modified bacteria, yeast, or cloned mammalian or human cells. Hyaluronidase can be also obtained commercially, from, for example, Wyeth-Ayerst (Wydase®), Abbot (Hyazyme), Bristol-Myers Squibb (Enzodase), and Ortho Pharmaceuticals (Diffusin). Non-limiting examples of hyaluronidases that can be used in the compositions are human hyaluronidase-1, human hyaluronidase-2, human hyaluronidase-3, human hyaluronidase-4, and human PH20.

Elastase (EC 3.4.21.36.) is a member of a group of enzymes termed "serine proteases," which are characterized by the reactivity of a serine residue in the active site of the enzyme. Elastase breaks down elastin, the specific protein of elastic fibers, and digests other proteins such as fibrin, hemoglobin and albumin. Three structurally related types of elastase, named elastases I, II and III (or protease E), have been identified, with several isoforms being secreted by the mammalian exocrine pancreas. Elastase has been confirmed to exist in the pancreas of most mammals, including humans, monkeys, cats, rabbits, etc. Elastase disclosed herein can be derived from any source, and can be produced by genetic engineering techniques. Non-limiting examples of elastases that can be used are human elastase I, human elastase II, and human elastase III.

In some embodiments, hyaluronidase, elastase, or combination thereof may be present in the composition from about 0.1 wt. % to about 10 wt. %, about 0.1 wt. % to about 9 wt. %, about 0.1 wt. % to about 8 wt. %, about 0.1 wt. % to about 7 wt. %, about 0.1 wt. % to about 6 wt. %, about 0.1 wt. % to about 5 wt. %, about 0.1 wt. % to about 4 wt. %, about 0.1 wt. % to about 3 wt. %, about 0.1 wt. % to about 3 wt. %, or about 0.1 wt. % to about 1 wt. %. Specific examples include about 0.1 wt. %, about 0.5 wt. %, about 1 wt. %, about 2 wt. %, about 5 wt. %, about 10 wt. %, and ranges between any two of these values. The weight percentages disclosed herein may be weight-to-weight or weight-to-volume percentages with respect to the total amount of the composition. The compositions of embodiments may contain an effective amount of lidocaine and an effective amount of a extracellular matrix component or fragment thereof. An effective amount of an lidocaine may vary among embodiments and may depend on the active agent incorporated into the composition, the activity of the active agent, the disease being treated, and the location and size of the treatment area. In various embodiments, the amount of lidocaine may be about 1 wt. % to about 95 wt. %, about 1 wt. % to about 75 wt. %, about 1 wt. % to about 50 wt. %, about 1 wt. % to about 40 wt. %, about 1 wt. % to about 30 wt. %, about 1 wt. % to about 25 wt. %, about 1 wt. % to about 10 wt. %, or any individual amount or any ranges between any two of these values. Weight percent is based on the total weight of the composition. including all its components.

In other embodiments, the composition may include lidocaine or bupivacaine in the concentrations described above, an extracellular matrix component or fragment thereof, and various carriers, excipients, additives, and combinations thereof. In such embodiments, the extracellular matrix component or fragment thereof may be present in a concentration of about 0.1 wt. % to about 10 wt. %, about 0.1 wt. % to about 9 wt. %, about 0.1 wt. % to about 8 wt. %, about 0.1 wt. % to about 7 wt. %, about 0.1 wt. % to about 6 wt. %, about 0.1 wt. % to about 5 wt. %, about 0.1 wt. % to about 4 wt. %, about 0.1 wt. % to about 3 wt. %, about 0.1 wt. % to about 2 wt. %, about 0.1 wt. % to about 1 wt. %, about 0.1 wt. %, about 0.5 wt. %, about 0.25 wt. % to about 10 wt. %, about 0.25 wt. % to about 1.0 wt. %, about 0.25 wt % to about 1.5 wt %, about 0.25 wt. % to about 2.0 wt. %, about 0.25 wt. % to about 3.0 wt. %, about 0.5 wt. % to about 5.0 wt. %, about 0.5 wt. % to about 3.0 wt. %, about 0.75 wt. % to about 7.5 wt. %, about 1.0 wt % to about 3 wt %, about 1.0 wt. % to about 5.0 wt. %, about 1 wt. %, about 2 wt. %, about 5 wt. %, about 10 wt. %, or any range or individual concentration falling within these example ranges. Weight percent is based on the total weight of the composition. including all its components. The mass of the extracellular matrix component or fragment thereof in such embodiments can vary between about 1 microgram to about 100 milligrams.

In some embodiments, the compositions may be encapsulated, or at least partially encapsulated in liposomes. Liposomes are well known and commonly used in the pharmaceutical arts, and any type of liposome can be used in the compositions of embodiments. In some embodiments, the liposomes may be composed of phosphatidylcholine (PC) and other constituents such as cholesterol and lipid-conjugated hydrophilic polymers. In other embodiments, the liposomes may contain chitosan or may be coated in chitosan (i.e., chitosomes).

In some embodiments, the compositions may include lipid nanoparticles or microparticles. Such nanoparticles can be prepared by forming an emulsion of active agent, extracellular matrix component, or both active agent and extracellular matrix component may be dispersed or dissolved in a solvent, and this solution may be combined with glycerol and poloxomer to form an emulsion. The emulsion can be heated, cooled, and homogenized to produce microparticles or nanoparticles. In other embodiments, the compositions may include commercially available nanoparticles or microparticles such as, for example, hybrid polyamidoamine (PAMAM) dendrimer hydrogel/poly (lactic-co-glycolic acid) (PLGA) nanoparticles or microparticles (HDNP), chitosan (CS) nanoparticles or microparticles, thiolated chitosan nanoparticles or microparticles, calcium phosphate (CaP) nanoparticles or microparticles, poly (lactic-co-glycolic acid) copolymer (PLGA), poly (ethyleneglycol)-block-poly(-caprolactone) nanopolymeric nanoparticles or microparticles, core/shell nanoparticles or microparticles composed of, for example, a lecithin liposome as the core and pluronic F 127 diacrylate (DA-PF 127), inorganically-coated retinoic acid (atRA) nanoparticles or microparticles, poly (lactic acid) (PLA) homopolymers and PEG-block-PLA copolymer nanoparticles or microparticles, PEG-block-PPG copolymers such as Pluronic®, PEGylated liposome-protamine-hyaluronic acid nanoparticles or microparticles, polylactic acid/polylactic acid-polyethylene oxide (PLA/PLA-PEO) nanoparticles or microparticles, and the like and combinations thereof. In various embodiments, the nanoparticles may have a diameter of from about 2 to about 200 nanometers, about 5 to about 50 nanometers, or about 18 to about 22 nanometers, or any range or individual value encompassed by these ranges.

Nanoparticles and microparticles can be used to aid in the delivery of compositions described above. In some embodiments, the extracellular matrix component or fragment thereof and active agent may be encapsulated within the nanoparticles or microparticles or ionically associated with the nanoparticle or microparticles. In other embodiments, the active agent can be encapsulated in the nanoparticles or microparticles and the extracellular matrix component or fragment thereof may be combined and unassociated with the nanoparticles or microparticles or ionically associated with the nanoparticle or microparticles, and in further embodiments, a portion of the active agent, extracellular matrix component, or both the active agent and extracellular matrix component may be encapsulated in the nanoparticles or microparticles and a portion of the active agent, extracellular matrix component, or both the active agent and extracellular matrix component are not encapsulated by the nanoparticles or microparticles.

In various embodiments, such formulations may include the composition, i.e. active agent and extracellular matrix component or fragment thereof, encapsulated by the microparticle or nanoparticle. In other embodiments, one or the other of the active agent or extracellular matrix component or fragment thereof may be encapsulated by the microparticle or nanoparticle. In still other embodiments, a portion of the composition may be encapsulated by the microparticles or nanoparticles and another portion of the composition may not be encapsulated by the microparticles or nanoparticles. In each such embodiment, the active agent or extracellular matrix component or fragment thereof may be ionically or covalently associated with the microparticles or nanoparticles or portions thereof either within the microparticle or nanoparticles or on an outer surface of the microparticle or nanoparticle. In some embodiments, the compositions described above may be encapsulated, or at least partially encapsulated in liposomes. Liposomes are well known and commonly used in the pharmaceutical arts, and any type of liposome can be used in the compositions of embodiments. In some embodiments, the liposomes may be composed of phosphatidylcholine (PC) and other constituents such as cholesterol and lipid-conjugated hydrophilic polymers. In other embodiments, the liposomes may contain chitosan or may be coated in chitosan (i.e. chitosomes).

Nanoparticle and microparticles can be used to aid in the delivery of compositions described above. In some embodiments, the extracellular matrix component and active agent may be encapsulated within the nanoparticles or microparticles or ionically associated with the nanoparticle or microparticles. In other embodiments, the active agent can be encapsulated in the nanoparticles or microparticles and the extracellular matrix component may be combined and unassociated with the nanoparticles or microparticles or ionically associated with the nanoparticle or microparticles, and in further embodiments, a portion of the active agent, extracellular matrix component, or both the active agent and extracellular matrix component may be encapsulated in the nanoparticles or microparticles and a portion of the active agent, extracellular matrix component, or both the active agent and extracellular matrix component are not encapsulated by the nanoparticles or microparticles.

In particular embodiments, the compositions may include colloidal lipids. Such compositions may include colloidal polar lipids formed from one or more non-ionic polyethylene glycol derivatives of castor oil and/or hydrogenated castor oil such as, for example, PEG-30 castor oil, PEG-33 castor oil, PEG-36 castor oil, PEG-40 castor oil, PEG-30 hydrogenated castor oil and PEG-40 hydrogenated castor oil, an anionic purified polysaccharide such as Gellan Gum, one or more buffering agents such as, for example, boric acid, trimethamine, and, in some embodiments, one or more aqueous lubricants and one or more colloidal aqueous lubricants. The liposomes or colloidal lipids may form particles about 1 nanometers to about 50 nanometers or about 6 nanometers to about 22 nanometers. The compositions of such embodiments may include about 0.1 w/v % to about 15 w/v % lipids. The compositions of various embodiments may include a base such as, for example, white petrolatum, white petrolatum USP, mineral jelly, petroleum jelly, yellow petrolatum, yellow soft paraffin, white soft paraffin, fats, waxes, sterols, fat-soluble vitamins, monoglycerides, diglycerides, triglycerides, phospholipids, PCCA plasticized base, and the like and combinations thereof.

In some embodiments, the base may be a liposomal base. Liposomal bases are an emulsion that includes a lipophilic component and an aqueous component that can be in the form of a lotion, a cream, a gel, or a paste. Examples of suitable liposomal bases include PCCA Lipoderm®, Lipoderm ActiveMax™, Anhydrous Lipoderm, and Lipoderm High Molecular Weight™ PCCA. Such liposomal base formulations can include, for example, about 60-80% wt/wt water combined with glycerin, $C_{12-15}$ alkyl benzoate, glyceryl stearate, dimethicone, cetearyl alcohol, cetearyl glucoside, polyacrylamide, cetyl alcohol, magnesium aluminum silicate, xanthan gum, aloe vera (aloe barbadensis), tocopheryl acetate (vitamin E acetate), *Prunus amygdalus amara* (bitter almond) kernel oil, *Vitis vinifera* (Grape) seed extract, *Triticum vulgare* (wheat) germ oil, retinyl palmitate (vitamin A palmitate), ascorbyl palmitate (vitamin C palmitate), Pro-Lipo Multi-emulsion Liposomic System, tetrasodium EDTA, phenoxyethanol, sodium hydroxymethylglycinate and the like and combinations thereof.

In some embodiments, the base may be cream base. Cream bases are semi-solid emulsions of oil and water. They are divided into two types: oil-in-water (O/W) creams which are composed of small droplets of oil dispersed in a continuous water phase, and water-in-oil (W/O) creams which are composed of small droplets of water dispersed in a continuous oily phase. Oil-in-water creams are more comfortable and cosmetically acceptable as they are less greasy and more easily washed off using water. Water-in-oil creams are more difficult to handle but many drugs which are incorporated into creams are hydrophobic and will be released more readily from a water-in-oil cream than an oil-in-water cream. Water-in-oil creams are also more moisturising as they provide an oily barrier which reduces water loss from the stratum corneum, the outermost layer of the skin. Cream bases typically include water, oil, emulsifier, and thickening agents, such as those discussed below.

In some embodiments, the base may be a moisturizing cream base. Moisturizing cream bases are composed of the same components as the cream bases described above with the addition of an emollient or humectant, that may provide a barrier that reduces water loss from the stratum corneum, the outermost layer of the skin. The emollient or humectant in a moisturizing cream base may be cetyl esters wax, stearyl alcohol, cetyl alcohol, and glycerin, or combinations thereof. Example cream bases and moisturizing cream bases include VersaBase (PCCA); Emollient cream, Vanishing cream, CeraVe, Vanicream, Vitamin E; Cliniderm; Dermabase (purified water, petrolatum, mineral oil, cetostearyl alcohol); Eucerin (water, petrolatum, mineral oil, ceresin, lanolin alcohol, methylchloroisothiozolinone, methylisothiazolinone); Glaxal (WellSpring Pharmaceutical Corp., Sarasota, Fla.); stearic acid cream, or any other pharmaceutical cream base used for topical formulations known to those skilled in the art.

In some embodiments, the base may be an ointment base. Ointments are compositions in which oil and water are provided in a ratio of from 7:1 to 2:1, from 5:1 to 3:1, or 4:1, and in some embodiments, the ointment may or may not include water, such as Aquaphor, Pracasil, and plasticized bases. Ointments are generally formulated using oils, waxes, water, alcohols, petroleum products, silicones, water, and other agents to prepare formulations with various viscosities and solvent properties. Commonly used formulations include oleaginous base (White Ointment), absorption base, W/O emulsion base (Cold Cream type base), O/W emulsion base (Hydrophilic Ointment), water soluble base, in addition to others. These preparations are used to dissolve or suspend substances or products with medicinal or cosmetic value.

In some embodiments, the base may be an emollient base. Non-limiting examples of emollient bases includes $C_9$-$C_{14}$ linear or branched alkyl alcohols, $C_3$-$C_{14}$ linear or branched polyols, $C_6$-$C_{14}$ di-esters of $C_6$-$C_{12}$ diacids, hydrocarbons, natural waxes, vegetable oils, and silicones, branched chain esters, ethoxylated partial glyceride fatty acid esters, protein derivatives, lanolin and lanolin derivatives, and fatty alcohol ethoxylates, emollient oils, fatty acids, fatty alcohols and their esters. such as, for example, isononyl isonanoate, dioctyl sebacate, isooctyl isooctanoate, dioctyl adipate, squalane, petrolatum, mineral oil, carnauba wax, candelilla wax, beeswax, sunflower oil, sesame oil, olive oil, cyclomethicone and dimethicone.

In some embodiments, the base may be a gel, and in certain embodiments, the gel may be a hydrated, cohesive gel. A cohesive gel may retain its shape and resist deformation after, for example, being subjected to shear or other stresses and may be less likely to degrade or become unstable over time or when subjected to external stimuli such as sterilization, relative to non-cohesive gels. In some embodiments, the gel may be crosslinked HA-based gel, which may or may not be a cohesive gel. In such embodiments, the HA-based gel may include about 1% to about 10% of free HA by volume based on the total volume of the composition.

The amount of base in the compositions of embodiments can vary and will depend on the amounts of the other components. More base can be added to compensate for smaller amounts of other components in the desired topical pharmaceutical formulation. In some embodiments, the base may be present in a concentration of about 45% (w/w) to about 99.75% (w/w) of the total composition, or any range or individual concentration known in the art.

In some embodiments, the compositions described above may further include one or more pharmaceutically acceptable diluents, fillers, disintegrants, binders, lubricants, surfactants, hydrophobic vehicles, water soluble vehicles, emulsifiers, buffers, humectants, moisturizers, solubilizers, preservatives, colorants, plasticizers, carriers, excipients, and the like and combinations thereof. The person of ordinary skill in the art can refer to various pharmacologic references such as, for example, Modern Pharmaceutics, Banker & Rhodes, Marcel Dekker, Inc. (1979) and Goodman & Gilman's The Pharmaceutical Basis of Therapeutics, 6th Edition, MacMillan Publishing Co, New York (1980) for guidance in determining the amount of such components in the compositions and formulations of embodiments.

In some embodiments, the composition may include a buffering agent. Buffering agents may be used to provide drug stability, to control the therapeutic activity of the drug substance, and to prevent the initial discomfort associated with injections. Suitable buffers include, but are not limited to, sodium bicarbonate, sodium citrate, citric acid, sodium phosphate, and the like and combinations thereof. When one or more buffers are utilized in the formulations of the invention, they may be combined with a pharmaceutically acceptable vehicle and present in an amount from about 0.1% (w/w) to about 20% (w/w).

In some embodiments, the compositions may include an antioxidant. Such antioxidant may be, for example, butylated hydroxytoluene, ascorbic acid, ascorbic palmitate, butylated hydroxyanisole, 2,4,5-trihydroxybutyrophenone, 4-hydroxymethyl-2,6-di-tert-butylphenol, erythorbic acid, gum guaiac, propyl gallate, thiodipropionic acid, dilauryl thiodipropionate, tert-butylhydroquinone, tocopherol, and the like and pharmaceutically acceptable salt or ester thereof or combinations thereof. The antioxidant can be present in a concentration of about 0.01% (w/w) to about 1% (w/w) of the total composition or any individual concentration encompassed by this example range.

In some embodiments, the composition may include an emulsifying agent including, for example, various monoglycerides, diglycerides, triglycerides, and blends thereof at a concentration of about 3% (w/w) to about 10% (w/w) of the total composition.

In some embodiments, the compositions may include a humectant that provides soothing, smoothing, moisturizing, or protects the skin. The humectant is not limited and can be, for example, calamine, dodecylsulphate, sodium lauryl sulphate (SLS), a polyoxyethylene ester of polysorbitan, such as monooleate, monolaurate, monopalmitate, monostearate esters, esters of sorbitan, the polyoxyethylenes ethers, the sodium dioctylsulphosuccinate (DOSS), lecithin, and sodium docusate. The amount of humectant in such compositions may be about 0.01% (w/w) to 5% (w/w) of the total composition.

In some embodiments, the secondary active agent including analgesic agents, antifungal agents, antibacterial agents, anesthetic agents, anti-inflammatory agents, anti-rosacea agents, vasoconstrictors, anti-acne agents, anti-claudication agents, skin retexturing agents and steroids including, but not limited to, retioinds (retinol, retinal, retinoic acid, retinyl propionate), salicylates (acetyl salicylic acid, methyl salicylate, salicyclic acid), benzoyl peroxide, minocycline, clindamycin hydrochloride, clindamycin phosphate, erythromycin, tetracycline, dicloxacilin, doxycycline, tretinoin, isoretinoin, adapalene, gabapentin, pregabalin, cyclosporine, tacrolimus (FK506), oxymetazoline, brimonidine, tetrahydrozoline, phenylephrine, clopidogrel, prasugrel, ticagrelor, ticlopidine, bimatoprost and other PGE2 inhibitors, tadalafil, clindamycin, cortisone, minoxidil, minoxidil sulfate, niacinamide, hydrocortisone, palmitoyl-KTTKS peptide, phenytoin, vitamin B12, cyclobenzaprine, anastrozole, lidocaine, minocycline, gentamicin sulfate, bimatoprost, minoxidil sulfate, clobetasol propionate, ascorbic acid, tranexamic acid, salicylic acid (sodium salicylate), hydroquinone, Renokin®, tolfnaftate, clotrimazole, terbinafine, isotretinoin, trentinoin, kojic acid, prednisone, a sunscreen actives such as homosalate, octisalate, octocrylene, or avobenzone, hydrocortisone, lidocaine, ixekizumab taltz, aminolevulinic acid (ALA), baricitinib, tofacitinib, adalimumab, citronella oil, 3(N-butyl-N-acetyl)aminopropionic acid ethyl ester, sarecycline, D3 analogs, calcineurin inhibitors, meclorethamine, immunization antigens, imiquimod, ibuprofen, celecoxib, diclofenac, sildenafil, cyclopyrox, sarecycline, estrogen, conjugated estrogens (PREMARIN®), potassium hydroxide, podophyllin, cantharidin, imiquimod, nitric acid, oral cimetidine, 5-fluorouracil, bleomycin, DNCB, imiquimod, and trichloroacetic acid, bleomycin, 2,4-dinitrochlorobenzene, fluorouracil, silver nitrate, zinc sulfate, zinc oxide, bacitracin, chlortetracycline, neomycin, mupirocin, polymyxin B, cuprimyxin, furazolidone, gentamycin, lincomycin, cephalosporins, betalactam antibiotics, lincomycin hydrochloride, tazarotene, vitamin A, acitretin, bexarotene, oxybutynin; vitamin D, vitamin C, vitamin B, vitamin E; sulfur; glucocorticosteroids, corticosteroids, triamcinolone, triamcinolone acetonide, betamethasone, betamethasone 1 7-valerate, betamethasone dipropionate, halcinonide, isoflupredone acetate, flumethasone, fluocinonide, mometasone, fluticasone, fluticasone propionate, prednisolone, beclomet(h)asone, hydrocortisone, cyproterone, drospirenone, estrogen, progestogen, tacrolimus, pimecrolimus, ursolic acid, betulinic acid, moronic acid, oleanolic acid, acyclovir, valaciclovir, famciclovir, penciclovir, docosanol, perillyl alcohol, and combinations thereof. In various embodiments, the compositions may include about 0.0001 wt. % to about 50 wt. %, about 0.001 wt. % to about 10 wt. %, about 0.01 wt. % to about 5 wt. %, or about 0.1 wt. % to about 1 wt. %, or any individual concentration or range of each secondary active agent contained in the composition.

In embodiments, the compositions may include other skin care agents, including, but not limited to, retinol, steroids, sunblock, salicylate, minocycline, antifungals, peptides, antibodies, lidocaine, and the like and combinations thereof. In some embodiments, other skin care agents include N-acyl amino acid compounds including, for example, N-acyl phenylalanine, N-acyl tyrosine, and the like, their isomers, including their D and L isomers, salts, derivatives, and mixtures thereof. An example of a suitable N-acyl amino acid is N-undecylenoyl-L-phenylalanine is commercially available under the tradename SEPIWHITE®. Other skin active agents include, but are not limited to, Lavandox, Thallasine 2, Argireline NP, Gatuline In-Tense and Gatuline Expression, Myoxinol LS 9736, Syn-ake, and Instensyl®, Sesaflash™, N-acetyl D-glucosamine, panthenol (for example, DL panthenol available from Alps Pharmaceutical Inc.), tocopheryl nicotinate, benzoyl peroxide, 3-hydroxy benzoic acid, flavonoids (for example, flavanone, chalcone), farnesol, phytantriol, glycolic acid, lactic acid, 4-hydroxy benzoic acid, acetyl salicylic acid, 2-hydroxybutanoic acid, 2-hydroxypentanoic acid, 2-hydroxyhexanoic acid, cis-retinoic acid, trans-retinoic acid, retinol, retinyl esters (for example, retinyl propionate), phytic acid, N-acetyl-L-cysteine, lipoic acid, tocopherol and its esters (for example, tocopheryl acetate: DL-a-tocopheryl acetate available from Eisai), azelaic acid, arachidonic acid, tetracycline, ibuprofen, naproxen, ketoprofen, hydrocortisone, acetominophen, resorcinol, phenoxyethanol, phenoxypropanol, phenoxyisopropanol, 2,4,4'-trichloro-2'-hydroxy diphenyl ether, 3,4,4'-trichlorocarbanilide, octopirox, lidocaine hydrochloride, clotrimazole, miconazole, ketoconazole, neomycin sulfate, theophylline, and mixtures thereof. Further skin care agents are disclosed in US Publication No. 2007/0020220A1, wherein the components/ingredients are incorporated herein by reference in their entirety.

In embodiments, the composition may further include a sensation modifying agent selected from the group of a cooling agent, a warming agent, a relaxing or soothing agent, a stimulating or refreshing agent, and combinations thereof.

In embodiments, the cooling agent is selected from but not limited to menthol; an isomer of menthol, a menthol derivative; 4-Methyl-3-(1-pyrrolidinyl)-2[5H]-furanone; WS-23, Icilin, Icilin Unilever Analog, 5-methyl-4-(1-pyrrolidinyl)-3-[2H]-furanone; 4,5-dimethyl-3-(1-pyrrolidinyl)-2 [5H]-furanone; isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxas-piro[4,5]decane-2-methanol, menthyl succinate and its alkaline earth metal salts, trimethylcyclohexanol, N-ethyl-2-isopropyl-5-methylcyclohexanecarb-oxamide, Japanese mint (*Mentha arvensis*) oil, peppermint oil, menthone, menthone glycerol ketal, menthyl lactate, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide and spearmint oil.

In embodiments, the warming agent is selected from but not limited to polyhydric alcohols, capsaicin, capsicum powder, a capsicum tincture, capsicum extract, capsaicin, hamamalis, homocapsaicin, homodihydrocapsaicin, nonanoyl vanillyl amide, nonanoic acid vanillyl ether, vanillyl alcohol alkyl ether derivatives, such as vanillyl ethyl ether, vanillyl butyl ether, vanillyl pentyl ether, and vanillyl hexyl ether, isovanillyl alcohol alkyl ethers, ethylvanillyl alcohol alkyl ethers, veratryl alcohol derivatives, substituted benzyl alcohol derivatives, substituted benzyl alcohol alkyl ethers, vanillin propylene glycol acetal, ethylvanillin propylene glycol acetal, ginger extract, ginger oil, gingeol and gingeron.

In embodiments, the relaxing or soothing agent is selected from but not limited to herb extracts, selected from the group consisting of aloe vera, alpha bisabolol, D-panthenol, allantoin, hamamelis, chamomile, yarrow; calendula, comfrey, witch hazel and other astringents, sea weed, and oat extracts; oils, selected from the group consisting of: almond oil, avocado oil, and comfrey; and essential oils, selected from the group consisting of: cardamone, eucalyptus, *Mentha piperita* (peppermint), hyssop, and rosemary; waxy or unctuous substances selected from the group consisting of: lanolin or vaseline jelly, minerals, selected from the group consisting of: zinc oxide, calamine and selenium; vitamins, selected from the group consisting of: tocopheryl acetate (vitamin E), and pharmaceutical agents selected from the group consisting of: analgesics, anesthetics, anti-inflammatory agents, and anti-histamines, and muscle relaxants; menthol, camphor, eugenol, eucalyptol, safrol, methyl salicylate, menthyl lactate, menthyl ethoxyacetate, menthone glycerinacetal, 3-1-menthoxypropane-1,2-diol, ethyl 1-menthyl carbonate, (1S,3S,4R)-p-menth-8-en-3-ol, menthyl pyrrolidone carboxylate, N-substituted-p-menthane-3-carboxamides hamamelis extract and ginger oil.

In embodiments, the stimulating or refreshing agent is selected from but not limited to an alcohol, L-menthol, camphor, menthe oil, capsicum extract, capsaicin, benzyl nicotinate, salicylate, glycol salicylate, acetyl choline, serotonin, histamine, a prostaglandin, a neurotransmitter; a CNS stimulant, caffeine and quinine.

Such compositions can be formulated in any dosage form including, for example, liquids, lotions, liniments, foams, and the like.

In some embodiments, the compositions described above may be formulated as a liquid. Liquid dosage forms for topical administration may include diluents such as, for example, alcohols, glycols, oils, water, and the like. Such compositions may also include wetting agents or emulsifiers. In some embodiments, the compositions of embodiments may be formulated as oil-in-water or water-in-oil emulsion. A cream can be a water-in-oil (w/o) emulsion in which an aqueous phase is dispersed in an oil phase, or an oil-in-water (o/w) emulsion in which an oil is dispersed within an aqueous base. An ointment generally refers to a more viscous oil-in-water cream. Traditional ointment bases (i.e. carrier) include hydrocarbons (petrolatum, beeswax, etc.) vegetable oils, fatty alcohols (cholesterol, lanolin, wool alcohol, stearyl alcohol, etc.) or silicones. Insoluble solids such as starch, zinc oxide, calcium carbonate, or talc can also be used in ointments and creams. Gel forms of the compositions described above can be formed by the entrapment of large amounts of aqueous or aqueous-alcoholic liquids in a network of polymers or of colloidal solid particles. Such polymers or colloids (gelling or thickening agents) are typically present at concentrations of less than 10% w/w and include carboxymethyl cellulose, hydroxypropylmethyl cellulose, hydroxyethyl cellulose, methyl cellulose, sodium alginate, alginic acid, pectin, tragacanth, carrageen, agar, clays, aluminum silicate, carbomers, and the like. In some embodiments, injectable formulations may be distributed as lyophilized (i.e. freeze dried) or vacuum-dried powder to prevent degradation and make the formulation easier to handle and less expensive to transport. Prior to use, powder formulations may be reconstituted with a liquid carrier, such as water or a saline solution.

In some embodiments, the topical formulations can be in the form of a lotion. Lotions are low- to medium-viscosity topical preparation. Most lotions are oil-in-water emulsions containing an emulsifier such as cetyl alcohol to prevent separation of these two phases. Lotions can include fragrances, glycerol, petroleum jelly, dyes, preservatives, proteins and stabilizing agents.

In some embodiments, the topical formulations can be in the form of a liniment. Liniments or balms are topical formulations that are of a similar viscosity to lotions and less viscous than an ointment or cream. Liniments are generally applied with friction by rubbing the liniment into the skin. Liniments typically are formulated from alcohol, acetone, or similar quickly evaporating solvents and may contain counterirritant aromatic chemical compounds such as methyl salicilate, benzoin resin, or capsaicin.

In some embodiments, the topical formulations can be in the form of a foam. Pharmaceutical foams are pressurized dosage forms containing one or more active ingredients that, upon valve actuation, emit a fine dispersion of liquid and/or solid materials in a gaseous medium. Foam formulations are generally easier to apply, are less dense, and spread more easily than other topical dosage forms. Foams may be formulated in various ways to provide emollient or drying functions to the skin, depending on the formulation constituents. Accordingly, this delivery technology is a useful addition to the spectrum of formulations available for topical use.

Certain embodiments include dermal fillers. In such embodiments, compositions such as those described above including an anaesthetic, a extracellular matrix component or fragment thereof, and various additional components or combinations thereof may include a collagen or hyaluronic acid filler. Currently available dermal fillers are mainly composed of collagen or hyaluronic acid. Dermal fillers may be composed of porcine-derived collagen, bovine-derived collagen, human collagen, synthesized collagen porcine-derived hyaluronic acid, bovine-derived hyaluronic acid, human hyaluronic acid, synthesized hyaluronic acid, and the like and combinations thereof. Embodiments include compositions containing any currently available dermal filler or combinations of such fillers. In some embodiments, the collagen or hyaluronic acid may be crosslinked. For example, in some embodiments, the crosslinked dermal filler may be a cross-linked dextran (DEAE sephadex) and hyaluronic acid. Such dermal fillers may exhibit volume augmentation immediately after injection. The hyaluronic acid degrades and is absorbed over six to twelve months, resulting in a hollow space. The dextan of the filler stimulates the body to produce new collagen that fills this hollow space with endogenous collagen.

In some embodiments, the dermal filler may be composed of polymethylmethacrylate (PMMA) and collagen. In such embodiments, liquid collagen may be mixed with a liquid or gel composition including an anesthetic and a extracellular matrix component or fragment thereof. This composition may be combined with PMMA and injected below the dermis. This dermal filler exhibits volume augmentation immediately after injection. The injected collagen is degraded, absorbed into the body, and replaced by newly produced endogenous collagen in its place. The PMMA stimulates the new collagen growth.

In some embodiments, the dermal filler may be composed of a cohesive crosslinked HA-based gel. In such embodiments, a precursor cohesive crosslinked HA-based gel, may be mixed with a solution containing lidocaine and a extracellular matrix component or fragment thereof. This composition may be homogenized to obtain a cohesive, at least partially crosslinked, HA-based composition including lidocaine that is stable to autoclaving. The cohesive, crosslinked HA-based gel may include about 1% to about 10% of free HA by volume based on the total volume of the composition. In some embodiments, the extracellular matrix component or fragment thereof may be HA, which may or may not be crosslinked or covalently associated with the crosslinked HA-based gel.

In various embodiments, the dermal filler may be collagen, hyaluronic acid, crosslinked collagen, crosslinked hyaluronic acid, and the like and any combinations thereof, and such dermal fillers may have a molecular weight of about 300 kDa (kilodaltons) to about 10,000 kDa, about 300 kDa to about 1,000 kDa, about 300 kDa to about 500 kDa, or any range or individual concentration encompassed by these example ranges. In contrast, the extracellular matrix component or fragment thereof of such embodiments may have an average molecular weight of less than about 300 kDa, about 0.2 kDs to about 200 kDa, about 1 kDa to about 100 kDa, or any range or individual concentration encompassed by these example ranges. The extracellular matrix component or fragment thereof may or may not be associated with the dermal filler either ionically or covalently and in particular, embodiments, any extracellular matrix component or fragment thereof associated with the dermal filler may dissociate from the dermal filler immediately, or within a 1 hr, 2 hr, or 3 hr window following administration. A wide variety of methods may be used for preparing the formulations described herein.

Broadly speaking, the formulations may be prepared by combining together the components of the formulation, as described herein, at a temperature and for a time sufficient to provide a pharmaceutically acceptable composition. For example, in some embodiments, the compositions components of the compositions may be dissolved, suspended, dispersed or otherwise mixed in a selected carrier or vehicle, at an effective concentration such that the condition to be treated is relieved or ameliorated.

The compositions of embodiments described above may enhance the strength of known topical active agent thereby reducing the necessary dosage required to achieve a therapeutically effective amount. For example, in some embodiments, the strength of a composition containing an active agent and extracellular matrix component or fragment thereof may be about equal to about 80% or 90% greater than the active agent delivered in a standard topical formulation. In other embodiments, the strength of a composition containing an active agent and extracellular matrix component or fragment thereof may be about equal to about 75% greater, about 1.0% to about 80% greater, about 1.0% to about 75% greater, about 1.0% to about 50% greater, about 1.0% to about 25% greater, about 2.0% to about 80% greater, about 2.0% to about 75% greater, about 2.0% to about 50% greater, about 2.0% to about 25% greater, about 5.0% to about 50% greater, about 5.0% to about 25% greater than the active agent delivered in a standard topical formulation. Thus, the compositions described herein may provide therapeutic equivalence of known topically administered active agents with that an administered dose that is equal to or at least about 75% less than a standard dose, equal to or about 50% less than a standard dose, equal to or about 25% less than a standard dose, equal to or about 10% less than a standard dose, about 1.0% to about 75% less than a standard dose, about 1.0% to about 50% less than a standard dose, about 1.0% to about 25% less than a standard dose, about 1.0% to about 10% less than a standard dose, about 2.0% to about 75% less than a standard dose, about 2.0% to about 50% less than a standard dose, about 2.0% to about 25% less than a standard dose, about 2.0% to about 10% less than a standard dose, or any range or individual value encompassed by these example ranges. The compositions disclosed herein may deliver the active agent more efficiently. That is, the effective amount of the active agent delivered at the site of administration is much more when compared to the delivery of the active agent without extracellular matrix component or fragment thereof.

Additional embodiments include methods for delivering an active agent. Such methods may include the step of applying a composition or formulation such as those described above including an active agent and extracellular matrix component or fragment thereof to a surface tissue of a subject. In some embodiments, methods may include the step of injecting the composition to a subdermal region of a patient. In other embodiments, the extracellular matrix component or fragment thereof may be applied to the surface tissue before topical administration of the active agent. In yet other embodiments, the active agent may be applied to a surface tissue followed by applying extracellular matrix component or fragment thereof to the surface tissue.

In some embodiments, the compositions may be delivered topically by, for example, applying the compositions directly to skin of a patient in need for treatment at the location of the injury or disease. In other embodiments, the compositions may be applied locally to the skin of a patient before, for example, surgery, injections, or other medically necessary injury. In further embodiments, the compositions may be administered transdermally, percutaneously, or by microneedle injection. Administration can also be, for example, intravenous, intraperitoneal, subdermal, subcutaneous, intradermal, transcutaneous, intramuscular, oral, intra-joint, parenteral, intranasal, or by inhalation. Suitable sites of administration thus include, but are not limited to, the skin, bronchium, gastrointestinal tract, eye, buccal cavity, and ear.

In embodiments such as those described above, the composition can be applied to the surface tissue one or more times each day, and applying can be carried out for a period of at least 1 month, 2 months, 3 months, 4 months, 6 months, 8 months, 12 months, or indefinitely depending on the condition of the patient or disease or injury being treated. In some embodiments, the composition may be administered once, as needed, once daily, twice daily, three times a day, once a week, twice a week, every other week, every other day, or the like. A dosing cycle may include administration for about 1 week, about 2 weeks, about 3 weeks, about 4 weeks, about 5 weeks, about 6 weeks, about 7 weeks, about 8 weeks, about 9 weeks, or about 10 weeks. After this cycle, a subsequent cycle may begin approximately 1, 2, 3, 4, 5, 6, 7, 8, 9, 10, 11, or 12 weeks later. The treatment regime may include 1, 2, 3, 4, 5, or 6 cycles, each cycle being spaced apart by approximately 1, 2, 3, 4, 5, 6, 7, 8, 9, 10, 11, or 12 weeks.

The methods of such embodiments can be used for treating nearly any condition. For example, the methods of embodiments can be used for treatment of pain arising from or associated with acute or chronic pain, somatic pain, visceral pain, inflammatory pain, neuropathy, arthritis, osteoarthritis, headache, and the like and combinations thereof. The pain may be local or systemic, and in some embodiments, the methods of the invention can be used for administering active agents for treating conditions that require transdermal delivery of the active agent. In particular, embodiments, the pain may be associated with chronic pain relief, cancer, motion sickness, chronic illnesses, acne, fungal or bacterial infections, skin cancer, abscesses, cellulitis, benign neoplasm, premalignancy, malignancy, warts, common warts, palmoplantar warts, flat warts, epidermodysplasia verruciformis related warts, anogenital warts, condyloma accuminatum; Herpesvirus related lesions including those induced by HHV-1 (HSV-1), HHV-2 (HSV-2), HHV-3 (varicella-zoster virus) e.g. chicken pox, Herpes zoster, shingles; Poxvirus induced lesions e.g. molluscum contagiosum, orf, callus, cutaneous horns, corns, acrochordons, fibroepithelial polyps, prurigo nodularis, actinic keratoses, squamous cell carcinoma, squamous cell carcinoma in situ, keratoacanthoma, basal cell carcinoma, cutaneous lymphomas and benign lymphocytic infiltrates & hyperplasias of the skin, clear cell acanthoma, large cell acanthoma, epidermolytic acanthoma, porokeratosis, hyperkeratosis, lichenoid keratosis, acanthosis, acanthosis nigricans, confluent and reticulated papillomatosis, nevi, including e.g. dermal nevi, epidermal nevi, compound nevi, ILVEN (inflammatory linear verrucous epidermal nevi), nevus sebaceous, nevus comedonicus, and the like; acne, e.g. comedonal acne, inflammatory acne, papular acne, pustular acne, cystic acne; cysts, e.g. epidermoid cysts, milia, trichilemmal cysts, follicular cysts, proliferating cysts, dermoid cysts, pilonidal cysts, apocrine cysts, eccrine cysts, sebaceous cysts, mucous cysts, myxoid cysts, ganglion cysts, synovial cysts, vellus hair cysts, steatocystoma, hidrocystoma; adnexal neoplasms e.g. trichofolliculoma, fibrofolliculoma, perifollicular fibroma, trichodiscoma, nevus sebaceous, chondroid syringoma, trichoepithelioma, trichoblastoma, desmoplastic trichoepithelioma, pilomatricoma, pilomatrical carcinoma, tricholemmoma, trichelemmal carcinoma, tumor of the follicular infundibulum, tricoadenoma, proliferating pilar tumor, sebaceous hyperplasia, sebaceous adenoma, sebaceous epithelioma, sebaceous carcinoma, syringoma, poroma, hidradenoma, apocrine hidradenoma, spiradenoma, cylindroma, eccrine nevus (eccrine hamartoma), papillary adenoma, papillary adenocarcinoma; Benign melanocytic neoplasms e.g. ephilides, café-au-lait macules, Becker's melanosis, lentigines, solar lentigines, lentigo simplex, mucosal melanocytic lesions, Mongolian spots, Nevus of Ota, blue nevus, common acquired melanocytic nevi (nevocellular nevus, "moles"), congenital nevi, nevus spilus, recurrent nevi; vascular and perivascular neoplasms and reactive hyperplasias e.g., hemangiomas, cherry angiomas, hobnail hemangiomas (targeted hemosiderotic hemangiomas), tufted angiomas, hemangioendotheliomas, angiolymphoid hyperplasia with eosinophilia (ALHE), Glomus tumors (glomangiomas), hemangiopericytomas; cutaneous neural and neuroendocrine neoplasms e.g. neuromas, Schwannomas, neurofibromas, nerve sheath tumor, nerve sheath myxoma, neurothekeoma, granular cell tumor; fibrotic and fibrohistiocytic proliferations e.g. acrochordons, fibroepithelial polyps, fibromas, fibrous papules, angiofibromas, pearly penile papules, periungual fibromas, dermatofibromas, fibrokeratomas, sclerotic or pleomorphic fibromas, connective tissue nevi; cutaneous scars, hyperplasias, keloids, rosacea, cutaneous fungal, dermatophyte & mold infections, onychomycosis, hyperpigmentation, rhytides, psoriasis, malignant melanoma, seborrheic keratosis, seborrheic keratosis variants including e.g. dermatosis papulosis nigra, inverted follicular keratosis/keratoma warty dyskeratosis/warty dyskeratoma, acrokeratosis verruciformis, stucco keratosis, hyperhidrosis, pachyonychia congenita, and the like and combinations thereof.

As indicated above, a "surface tissue" includes any surface tissue such as, but not limited to, skin, mucosa, eyes, ears, inside the nose, inside the mouth, lips, urethral openings, vagina, anus, tongue, frenulum of tongue, hair, teeth, bone, and the like. Accordingly, administration of the compositions can be to any surface tissue, including skin, mucosa, eyes, ears, inside the nose, inside the mouth, lips, urethral openings, vaginal, anus, tongue, frenulum of tongue, hair, teeth, bone, and the like.

In some embodiments, the methods may include a variety of additional steps including, for example, cleaning the surface tissue at the site of applying, and the like. In some embodiments, the methods may further include ablation of the tissue surface before, during or after administration of the compositions described herein. In embodiments, tissue surface ablation may include electromagnetic radiation, laser, dermal abrasion, chemical peel, ultrasound, heating, cooling, or by a needle. In certain embodiments, the tissue surface is ablated with abrasion. Abrasion of the outer layer or epidermis of the skin (dermal abrasion) is desirable to smooth or blend scars, blemishes, or other skin conditions that may be caused by, for example, acne, sun exposure, and aging. Standard techniques used to abrade the skin have generally been separated into two fields referred to as dermabrasion and microdermabrasion. Both techniques remove portions of the epidermis called the stratum corneum, which the body interprets as a mild injury. The body then replaces the lost skin cells, resulting in a new outer layer of skin. Additionally, despite the mild edema and erythema associated with the procedures, the skin looks and feels smoother because of the new outer layer of skin. In some embodiments, the tissue surface is ablated with microdermabrasion. Microdermabrasion refers generally to a procedure in which the surface of the skin is removed due to mechanical rubbing by a handpiece emitting a stream of sand or grit. For example, a handpiece can be used to direct an air flow containing tiny crystals of aluminum oxide, sodium chloride, or sodium bicarbonate. The momentum of the grit tends to wear away two to three cell layers of the skin with each pass of the handpiece. Alternatively, new "crystal-free" microdermabrasion techniques utilize a diamond-tipped handpiece without a stream of grit.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

A cream will be prepared and administered directly to the affected area. Example creams are provided in Table 1:

TABLE 1

|  | 1 | 2 | 3 | 4 | 5 |
|---|---|---|---|---|---|
| Lidocaine | 5% | 5% | 2% | 2% | 1% |
| HA | 1% | 5% | 5% | 10% | 5% |
| Buffer | 0.5%-7% | 0.5%-7% | 0.5%-7% | 0.5%-7% | 0.5%-7% |
| Cream base | 87%-93.5% | 82%-90.5% | 86%-92.5% | 81%-87.5% | 87%-93.5% |

Lidocaine may be Lidocaine HCl. The HA may have a weight average molecular of about 10,000 KD to about 50,000 KD. The cream base may contain, for example, emulsifiers such as cetyl alcohol, stearyl alcohol, and the like, preservatives such as methylparaben, propylparaben, and the like, buffers such as sodium hydroxide, stabilizers such as stearic acid, oils such as mineral oil, emollients such as propylene glycol, emulsifiers such as polysorbate 80, sorbitan monostearate, and the like, coagulants, such as aluminum sulfate and the like, binders such as calcium acetate and the like, anti-irritants such as petrolatum and the like, purified water, and various combinations thereof.

Example 2

An liquid will be prepared and administered directly to the affected area. Example creams are provided in Table 2:

TABLE 2

|  | 1 | 2 | 3 | 4 | 5 |
|---|---|---|---|---|---|
| Lidocaine | 5% | 5% | 2% | 2% | 1% |
| HA | 1% | 5% | 5% | 10% | 5% |
| Buffer | 0.5%-7% | 0.5%-7% | 0.5%-7% | 0.5%-7% | 0.5%-7% |
| Liquid base | 87%-93.5% | 82%-90.5% | 86%-92.5% | 81%-87.5% | 87%-93.5% |

Lidocaine may be Lidocaine HCl. The HA may have a weight average molecular of about 10,000 KD to about 50,000 KD. The liquid base may contain, for example, preservatives such as methylparaben, propylparaben, and the like, buffers such as sodium hydroxide, stabilizers such as carboxymethylcellulose and the like, purified water, and various combinations thereof. In embodiments for oral administration, such formulations may include flavoring, sweeteners, and the like and combinations thereof.

Example 3

A gel will be prepared and administered directly to the affected area. Example creams are provided in Table 3:

TABLE 3

|  | 1 | 2 | 3 | 4 | 5 |
|---|---|---|---|---|---|
| Lidocaine | 5% | 5% | 2% | 2% | 1% |
| HA | 1% | 5% | 5% | 10% | 5% |
| Buffer | 0.5%-7% | 0.5%-7% | 0.5%-7% | 0.5%-7% | 0.5%-7% |
| Plasticized base | 87%-93.5% | 82%-90.5% | 86%-92.5% | 81%-87.5% | 87%-93.5% |

Lidocaine may be Lidocaine HCl. The HA may have a weight average molecular of about 10,000 KD to about 50,000 KD. The plasticized gel base may contain, preservatives such as methylparaben, propylparaben, and the like, buffers such as sodium hydroxide, oils such as mineral oil, emollients such as propylene glycol, antioxidants such as butylated hydroxytoluene and the like, purified water, and various combinations thereof.

Example 4

Lidocaine chlorhydrate (lidocaine HCl) will be solubilized in WFI and filtered through a 0.2 µm filter. Dilute NaOH solution will be added to a cohesive crosslinked HA gel, having a substantially neutral pH, preferably about 7.2 and no visibly distinct particles in a fluidic media prepared as described in U.S. Pat. No. 10,485,896, which is hereby incorporated by reference, to reach a pH of about 7.5 and about 8. The lidocaine HCl solution and HA will then be added to the gel to reach a final desired concentration, for example, a concentration of about 0.1 wt. % to about 2.0 wt. %. The resulting pH of the HA/lidocaine mixture should be about 7, the HA concentration in the crosslinked HA gel should be about 24 mg/mL, the concentration of HA should be about 1 wt. % to about 10 wt. %. Mechanical mixing may produce better homogeneity in a standard reactor equipped with an appropriate blender mechanism. The resulting composition is cohesive.

Example 5

Gabapentin was solubilized in WFI and filtered through a 0.2 µm filter. Dilute NaOH solution will be added to a cohesive crosslinked HA gel, having a substantially neutral pH, preferably about 7.2 and no visibly distinct particles in a fluidic media prepared as described in U.S. Pat. No. 10,485,896, which is hereby incorporated by reference, to reach a pH of about 7.5 and about 8. The gabapentin solution and HA was added to the gel to reach a final of about 0.1 wt. % to about 2.0 wt. %. The resulting pH of the HA/gabapentin mixture was about 7. The HA concentration in the crosslinked HA gel was about 24 mg/mL, and the concentration of HA was about 1 wt. % to about 10 wt. %.

Example 6

The composition of Example 5 was topically administered to patients exhibiting symptoms of Painful Diabetic Neuropathy (PDN). PDN is the most common complication of diabetes, and often affects feet and legs first, followed by hands and arms. Chronic, progressively severe pain, often with burning sensation, leading to numbness is experienced by PDN patients. Gabapentin and pregabalin, which provides gabapentin-like efficacy, are often used to treat PDN. However, side effects resulting from oral delivery of gabapentin, including drowsiness and dizziness, impair activities of daily living and work, and co-abuse by opioid abusers, make gabapentin unattractive to physicians.

When the composition of Example 5 was topically administered to PDN patients, the resulting effective tissue concentration is greater than about 2.4 mcg/gram for PDN patients. See FIG. 1. A high signal to noise ratio was noted in these clinical trials. Notably, achieving gabapentin tissue levels with oral delivery requires a systemic dose of greater than 600 mg of gabapentin.

Example 7

An investigator-initiated pilot study was carried out with 6 PDN patients. The subjects were administered the composition described in Example 5 in a single-arm open label study. Each subject exhibited a PDN baseline mean pain of greater than or equal to 5 on 11-point scale. The composition was administered directly to the affected area every 6 to 8 hours over 4 weeks. Subjects recorded daily pain, sleep, multi-domain pain impact (MDPI), and the use of rescue medicine.

Figure 2:
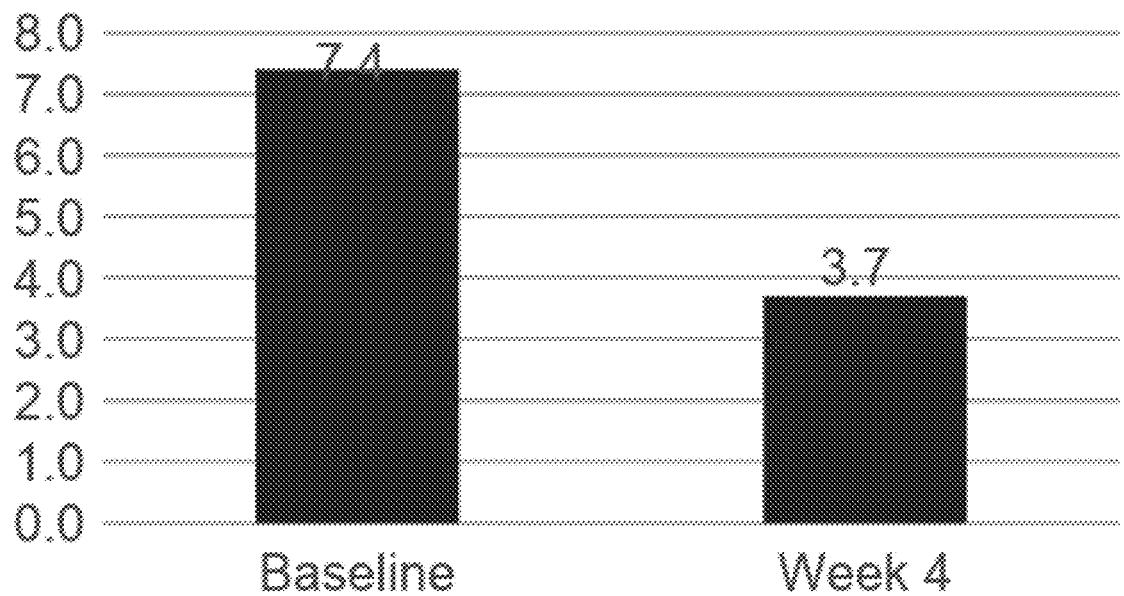
FIG. 2 is a bar graph showing a reduction in mean weekly pain intensity score for Painful Diabetic Neuropathy (PDN) patients treated with a composition containing gabapentin and hyaluronic acid over 4 weeks.

FIG. 2 shows the change from baseline in mean weekly pain intensity score over 4 weeks treatment. The mean weekly pain intensity score dropped about 50% over 4 weeks of treatment as illustrated in FIG. 2. In addition, this cohort of patients recorded no adverse events, all normal vital signs, no skin reaction/erythema, no use of opiates/narcotics as rescue medicines. In fact, rescue medicine use dropped from 100% to 11% across the test subjects.

---

The invention claimed is:

1. A method of treating a subject having Painful Diabetic Neuropathy (PDN), the method comprising topically administering to a surface skin tissue of the subject a composition comprising an anesthetic and an extracellular matrix component or fragment thereof, wherein the anesthetic is gabapentin, the extracellular matrix component or fragment thereof is hyaluronic acid or fragments of hyaluronic acid, and the topically administering results in an effective tissue concentration of the anesthetic of greater than about 2.4 mcg/gram.

2. The method of claim 1, wherein the composition comprises about 0.1 wt. % to about 10 wt. % anesthetic based on the total weight of the composition.

3. The method of claim 1, comprising about 5 wt. % to about 25 wt. % extracellular matrix component or fragment thereof based on the total weight of the composition.

4. The method of claim 1, wherein the composition further comprises diluents, fillers, disintegrants, binders, lubricants, surfactants, hydrophobic vehicles, antioxidants, vitamins, water soluble vehicles, emulsifiers, buffers, humectants, moisturizers, solubilizers, preservatives, colorants, plasticizers, carriers, excipients, secondary active agents and combinations thereof.

5. The method of claim 1, wherein the composition further comprises lipid nanoparticles, microparticles, colloidal lipids, and combinations thereof.

6. The method of claim 1, wherein anesthesia is attained within the first 300 seconds after administering or injecting.

7. The method of claim 1, wherein the extracellular matrix component or fragment thereof has an average molecular weight of about 2,000 Da to about 100,000 Da.

8. The method of claim 1, wherein at least 99.9% of the extracellular matrix component or fragment thereof has a molecular weight of less than 59,000 Da.

9. A method of treating Painful Diabetic Neuropathy (PDN) comprising topically administering to a skin surface tissue of a subject in need treatment a composition comprising an anesthetic and about 0.1 wt. % to about 15 wt. % of an extracellular matrix component or fragment thereof based on the total weight of the composition wherein the anesthetic is gabapentin, the extracellular matrix component or fragment thereof is hyaluronic acid or fragments of hyaluronic acid, and the topically administering results in an effective tissue concentration of the anesthetic of greater than about 2.4 mcg/gram.

10. The method of claim 9, wherein the extracellular matrix component or fragment thereof has an average molecular weight of about 2,000 Da to about 100,000 Da.

11. The method of claim 9, wherein at least 99.9% of the extracellular matrix component or fragment thereof has a molecular weight of less than 59,000 Da.

12. The method of claim 9, comprising about 4 wt. % to about 7 wt. % extracellular matrix component or fragment thereof active agent based on the total weight of the composition.

13. The method of claim 9 wherein the composition is applied as a powder to the surface skin tissue at least twice daily for at least two weeks.

14. The method of claim 1, wherein the composition is a powder composition including a powder anesthetic and a powder extracellular matrix component or fragment thereof, and the powder composition is applied as a powder to the surface skin tissue.

15. A method of treating a subject with Painful Diabetic Neuropathy (PDN), the method comprising topically administering to a surface skin tissue of a subject having neuropathy pain a composition comprising an anesthetic and an extracellular matrix component or fragment thereof, wherein the anesthetic is gabapentin, the extracellular matrix component or fragment thereof is hyaluronic acid or fragments of hyaluronic acid, and the topically administering results in an effective tissue concentration of the anesthetic of greater than about 2.4 mcg/gram, and a reduction in reported pain by the subject.

* * * * *